US010165115B1

(12) United States Patent
Kreiner et al.

(10) Patent No.: US 10,165,115 B1
(45) **Date of Patent: *Dec. 25, 2018**

(54) COMMUNICATIONS HANDLER FOR SCREENING INCOMING CALLS

(71) Applicants: AT&T Intellectual Property I, L.P., Atlanta, GA (US); AT&T Mobility II LLC, Atlanta, GA (US)

(72) Inventors: Barrett Kreiner, Woodstock, GA (US); Robert Shively, Suwanee, GA (US); Ryan Schaub, Peachtree Corners, GA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/879,523

(22) Filed: Jan. 25, 2018

Related U.S. Application Data

(63) Continuation of application No. 15/668,991, filed on Aug. 4, 2017, now Pat. No. 9,900,431.

(51) Int. Cl.
*H04M 3/42* (2006.01)
*H04M 3/436* (2006.01)
(Continued)

(52) U.S. Cl.
CPC ............ *H04M 3/436* (2013.01); *H04M 1/57* (2013.01); *H04M 1/665* (2013.01);
(Continued)

(58) Field of Classification Search
CPC ............ H04M 3/436; H04M 3/42059; H04M 3/42042; H04M 3/42034; H04M 3/42025
(Continued)

(56) References Cited

U.S. PATENT DOCUMENTS 5,946,386 A 8/1999 Rogers et al.
6,216,230 B1 4/2001 Rallis et al.
(Continued)

FOREIGN PATENT DOCUMENTS

KR 20090000700 1/2009
KR 20090009065 1/2009
(Continued)

OTHER PUBLICATIONS

Obihai Technology, Inc., "Obi302 VoIP Telephone Adapter with 2-Phone Ports, Router & USB," Obi302 Detailed Technical Specifications, 2010-2012 Obihai Technology, Inc., retrieved at http://www.obihai.com/docs/OBi302DS.pdf on May 19, 2017.
(Continued)

*Primary Examiner* — Thjaun K Addy
(74) *Attorney, Agent, or Firm* — Hartman & Citrin LLC

(57) ABSTRACT

Concepts and technologies for handling and screening incoming calls are provided. A processor executing instructions associated with a call handling service can detect that a call from a calling party is being routed, via a communication interface, to a called party device associated with a customer. The processor can obtain caller identification data that can specify an identity that is generated by the calling party and intended to be representative of the calling party when presented to the customer by the called party device. The processor can determine an interface identifier associated with the communication interface, and retrieve a call authentication scenario based on the interface identifier. The call authentication scenario can specify a storage location of data. The processor can obtain the data from the storage location, determine a call handling action, prepare a call handling command, and provide the call handling command to a network.

20 Claims, 7 Drawing Sheets

(51) Int. Cl.
*H04M 1/57* (2006.01)
*H04M 1/665* (2006.01)

(52) U.S. Cl.
CPC .. *H04M 3/42068* (2013.01); *H04M 2203/554* (2013.01); *H04M 2207/12* (2013.01); *H04M 2242/22* (2013.01)

(58) Field of Classification Search
USPC ............ 379/211.02, 211.01, 207.15, 201.01, 379/201.02, 212.01, 207.02, 201.08, 379/207.13
See application file for complete search history.

(56) References Cited

U.S. PATENT DOCUMENTS

| | | | |
|---|---|---|---|
| 6,587,458 | B1 | 7/2003 | Burg et al. |
| 7,023,979 | B1 * | 4/2006 | Wu .................... H04M 3/5233 379/265.11 |
| 7,280,647 | B2 | 10/2007 | Henderson |
| 8,594,287 | B2 | 11/2013 | Dolan et al. |
| 8,594,298 | B2 | 11/2013 | Klein |
| 8,676,577 | B2 | 3/2014 | Jablokov et al. |
| 9,160,846 | B2 | 10/2015 | Daniel et al. |
| 9,462,105 | B2 | 10/2016 | Feller |
| 2003/0007626 | A1 | 1/2003 | Glebocki |
| 2006/0193453 | A1 | 8/2006 | Price |
| 2009/0193507 | A1 | 7/2009 | Ibrahim |
| 2010/0130169 | A1 | 5/2010 | Narayanaswamy |
| 2011/0029638 | A1 | 2/2011 | Stremel et al. |
| 2014/0051411 | A1 | 2/2014 | Sweeney et al. |
| 2014/0150037 | A1 | 5/2014 | Cavgalar |
| 2015/0326714 | A1 | 11/2015 | Roncoroni et al. |
| 2015/0334231 | A1 | 11/2015 | Rybak et al. |
| 2016/0234390 | A1 | 8/2016 | Roncoroni et al. |
| 2017/0041462 | A1 | 2/2017 | Rensburg et al. |

FOREIGN PATENT DOCUMENTS

| | | |
|---|---|---|
| KR | 101272714 | 6/2013 |
| TW | 201218735 | 11/2012 |
| TW | I507009 | 9/2015 |
| WO | WO 2005/083995 | 9/2005 |
| WO | WO 2013/082333 | 6/2013 |
| WO | WO 2016/091074 | 6/2016 |

OTHER PUBLICATIONS

Cisco Documentation Team, “Change a Company Caller ID Name,” Feb. 3, 2017, Cisco Help Central, 2017 Cisco, retrieved at https://help.webex.com/docs/DOC-16391.

Neustar, “Caller ID,” retrieved at https://web.archive.org/web/20170518152425/https://www.neustar.biz/communications/caller-id/caller-name-services on May 18, 2017.

U.S. Notice of Allowance dated Oct. 2, 2017 in U.S. Appl. No. 15/668,991.

* cited by examiner

COMMUNICATIONS HANDLER FOR SCREENING INCOMING CALLS

CROSS-REFERENCE TO RELATED APPLICATIONS

This application is a continuation of U.S. patent application Ser. No. 15/668,991, entitled "Communications Handler for Screening Incoming Calls," filed Aug. 4, 2017, now U.S. Pat. No. 9,900,431, which is incorporated herein by reference in its entirety.

BACKGROUND

Over the past several years, communication devices have become prevalent, whether fixed line, mobile, or even implemented as programs running in web browsers. Because of the prevalence of these devices, modern users may almost always be considered available and/or capable of engaging in various audio and/or visual communication, irrespective of whether the user is available.

Users of communication devices can receive many calls per day at times when, although convenient for the caller, may not be convenient for the user that is the intended recipient of the calls. Increasingly, a growing number of calls originate from a calling party with the intent to obfuscate or mislead (e.g., from spammers and/or nefarious commercial entities), and thus it may never be convenient for the user to accept those calls. Repeated calls of this nature can lead a user to only answer calls when the user believes they know and/or are familiar with the identity of the calling party. As such, legitimate, innocuous callers—who are unknown or unfamiliar to the caller but who are making bona fide calls that the user would otherwise accept—may have their calls ignored or denied, thereby leaving the legitimate caller with less avenues to contact the user.

SUMMARY

The present disclosure is directed to a call handling service that is configured to screen, authenticate, and route or otherwise handle calls. The call handling service is further configured to prompt actions by other processors, servers, and/or entities. As used herein, the term "call" is intended to refer to a communication that is directed to a specific communication device for presentation by the communication device. The term "communication" is intended to refer to a message and/or file that provides audio data and/or visual data (e.g., through moving and/or still images) to the communication device. A call can include an audio call, a video call, an audio voicemail message, a visual voicemail message, and/or other live or recorded communications that provide speech, sound, and/or video messages to a user through a communication device. The call handling service can be hosted or executed by a computer system. In some embodiments, the computer system executing the call handling service can be in communication with a network that routes a call and is in communication with the communication device that is the intended recipient of the call. The call handling service can be interacted with by a user or other input provider (e.g., an administrator, a customer, or other user using a user device or other non-generic device) to submit call management data to the call handling service. The call management data can be obtained by the call handling service and used by the call handling service to generate one or more call authentication scenarios. The call authentication scenarios can be associated with implementation for one or more users, accounts, devices, or the like such as, for example, a called party device, and can be stored by the call handling service in a data storage device such as a data store.

After a call is initiated by the calling party, the call handling service can detect that a call is being received or otherwise routed to a called party device. In various embodiments, the call can be detected by the call handling service as the call is being routed through a communication interface from a network, from an Internet protocol multimedia subsystem ("IMS"), from a proxy call session control function ("PCSCF"), and/or from other entities in response to receiving the call destined for the called party device. The call handling service can perform various functions or otherwise provide various commands depending on the communication interface that is used to route the call. The call handling service can obtain, from a called party device, the network, or other network entity, caller identification ("caller ID") data associated with the call, one or more call authentication scenarios, and data from one or more storage devices that are relevant to the call. The call handling service can use the call authentication scenarios, the caller identification data, and the data from the storage devices to analyze the identity provided and/or portrayed by the calling party to determine how the call is to be handled. The call handling service can issue a call handling command based on the caller identification data and the call authentication scenarios. In some embodiments, the call handling command can be issued to the network. In some embodiments, the call handling command can be issued to components of the network, such as the PCSCF of the IMS within the network, in order to effect the handling of the call, and/or, if specified, the call handling command can be used to direct associated actions. It therefore should be understood that for purposes of this disclosure, the phrase "call authentication scenario" can be used to refer to instructions for identifying and authenticating calls so as to facilitate and/or prompt the creating of commands and/or triggering actions or requests to other entities, processors, or the like in order to handle the calls.

According to one aspect of the concepts and technologies disclosed herein, a method is disclosed. The method can include detecting, by a processor of a system, that a call from a calling party is being routed to a called party device associated with a customer. In embodiments, the processor can execute a call handling service stored in a memory of the system. The call can be intended for the called party device associated with the customer, and the call can be routed via a communication interface. The method also can include obtaining, by the processor, caller identification data that is associated with the call. The caller identification data can specify an identity that is generated by the calling party, such as via the calling party device. The caller identification data generated by the calling party is intended to be representative of the calling party when presented to the customer by the called party device. The method also can include determining, by the processor, an interface identifier associated with the communication interface. The method also can include retrieving, by the processor, a call authentication scenario based on the interface identifier associated with the communication interface. The call authentication scenario can specify a storage location of data that is to be accessed. The method also can include obtaining, by the processor, the data from the storage location specified by the call authentication scenario. In some embodiments, obtaining the data from the storage location can include obtaining siloed data from a siloed data source and obtaining collective data from a collective data source. In some embodiments, the siloed data source can be associated with the customer, and the collective data source can be remote from the system.

The method also can include determining, by the processor, a call handling action at least by analyzing one or more of the caller identification data, the data obtained from the storage location, and the call authentication scenario. The method also can include preparing, by the processor, a call handling command based at least in part on one or more of the call handling action, the caller identification data, the data obtained from the storage location, and the call authentication scenario. The method also can include providing, by the processor, the call handling command to a network from which the call is being routed. The call handling command can direct the performance of the call handling action for the call. In embodiments, the call handling command can direct the network to perform the call handling action, at least in part. In embodiments, the call handling command directs that a call handling action be performed in response to the call handling command being provided to the network.

In some embodiments, the communication interface can be one of a plurality of communication interfaces identifiable by the processor. The communication interface can be associated with at least one of a voice over internet protocol, a plain old telephone service, a wireless local area network, a wireless wide area network, or a software defined network controller. In some embodiments, the call is detected by the processor before the call is received by the called party device. In some embodiments, the system can comprise a pass-through dongle that is an intermediary between the called party device and the network with which the call is routed. In some embodiments, the network can include an internet protocol multimedia subsystem that can include a proxy call session control function, and the proxy call session control function can perform the call handling action, at least in part, in response to receiving the call handling command. In some embodiments, the call handling action can include at least one of allowing the call to proceed to the called party device, preventing the call from proceeding to the called party device, sending the call to voicemail, ignoring the call, diverting the call, or combinations thereof.

In some embodiments, the method further can include generating, by the processor, the call authentication scenario. In some embodiments, generating the call authentication scenario can include obtaining, from a user device, call management data; creating, by the processor, a call authentication scenario based on the call management data; and storing, by the processor, the call authentication scenario. The call management data can include a call authentication parameter, a data source identifier that identifies a data source that comprises the storage location of data to be accessed, customer account data that identifies a customer account associated with the called party device that is the intended recipient of the call, communication interface data that identifies the communication interface with which a call authentication parameter applies, and a call handling action identifier that defines one or more actions to be performed in response to the call handling command being provided to the network when the call authentication parameter applies.

In some embodiments, the call handling action can include diverting the call to an unassociated target, and storing a call data record that documents the call being diverted to the unassociated target. In some embodiments, diverting the call to the unassociated target can be based on determining that the identity specified in the caller identification data is representative of the unassociated target despite the caller identification data being generated by a calling party device associated with the calling party, where the calling party is not associated with the unassociated target. In some embodiments, the method further can include providing, by the processor, the call handling command to a usage server. The call handling command can direct the usage server to concatenate the caller identification data with the call data record that documents the call being diverted to the unassociated target.

According to another aspect of the concepts and technologies disclosed herein, a system is disclosed. The system can include a processor and a memory. The memory can store computer-executable instructions that, when executed by the processor, cause the processor to perform operations. The operations can include detecting that a call from a calling party is being routed to a called party device associated with a customer. The call can be intended for the called party device associated with the customer, and the call can be routed via a communication interface. The operations also can include obtaining caller identification data that is associated with the call. The caller identification data can specify an identity that is generated by the calling party, and the caller identification data is intended to be representative of the calling party when presented to the customer by the called party device. The operations also can include determining an interface identifier associated with the communication interface. The operations also can include retrieving a call authentication scenario based on the interface identifier associated with the communication interface. The call authentication scenario can specify a storage location of data that is to be accessed. The operations also can include obtaining the data from the storage location specified by the call authentication scenario. In some embodiments, obtaining the data from the storage location can include obtaining siloed data from a siloed data source and obtaining collective data from a collective data source. In some embodiments, the siloed data source can be associated with the customer and the collective data source can be remote from the call handling service.

In some embodiments, the operations also can include determining a call handling action. In some embodiments, determining the call handling action can include analyzing at least one of the caller identification data, the data obtained from the storage location, the call authentication scenario, or combinations thereof. The operations also can include preparing a call handling command based at least in part on one or more of the call handling action, the caller identification data, the data obtained from the storage location, and the call authentication scenario. The operations also can include providing the call handling command to a network from which the call is being routed. The call handling command can direct the performance of the call handling action for the call. In embodiments, the call handling command can direct the network to perform at least part of the call handling action in response to the call handling command being provided to the network.

In some embodiments, the communication interface can be one of a plurality of communication interfaces identifiable by the processor. The communication interface can be associated with at least one of a voice over internet protocol, a plain old telephone service, a wireless local area network, a wireless wide area network, a software defined network controller, or combinations thereof. In some embodiments, the call can be detected by the processor before the call is received by the called party device. In some embodiments, the system can include a pass-through dongle that is an intermediary between the called party device and the network with which the call is routed. In embodiments, the processor executing the instructions can be included within the pass-through dongle. In some embodiments, the network can include an internet protocol multimedia subsystem that can include a proxy call session control function, and the proxy call session control function can perform the call handling action, at least in part, in response to receiving the call handling command. In some embodiments, the call handling action can include at least one of allowing the call to proceed to the called party device, preventing the call from proceeding to the called party device, sending the call to voicemail, ignoring the call, diverting the call, or combinations thereof.

In some embodiments, the operations further can include generating, by the processor, the call authentication scenario. In some embodiments, generating the call authentication scenario can include obtaining, from a user device, call management data; creating, by the processor, a call authentication scenario based on the call management data; and storing, by the processor, the call authentication scenario. The call management data can include a call authentication parameter, a data source identifier that identifies a data source that comprises the storage location of data to be accessed, customer account data that identifies a customer account associated with the called party device that is an intended recipient of the call, communication interface data that identifies the communication interface with which the call authentication parameter applies, and a call handling action identifier that defines one or more actions to be performed in response to the call handling command being provided to the network when the call authentication parameter applies.

In some embodiments, the call handling action can include diverting the call to an unassociated target and storing a call data record that documents the call being diverted to the unassociated target. In some embodiments, diverting the call to the unassociated target can be based on determining that the identity specified in the caller identification data is representative of the unassociated target despite the caller identification data being generated by a calling party device associated with the calling party, where the calling party is not associated with the unassociated target. In some embodiments, the operations further can include providing, by the processor, the call handling command to a usage server. The call handling command can direct the usage server to concatenate the caller identification data with the call data record that documents the call being diverted to the unassociated target.

According to yet another aspect, a computer storage medium is disclosed. The computer storage medium can have computer-executable instructions stored thereon. When the computer-executable instructions are executed by a processor, the processor can perform operations including detecting that a call from a calling party is being routed, via a communication interface, to a called party device associated with a customer, where the call is intended for the called party device associated with the customer. The operations also can include obtaining caller identification data that is associated with the call. The caller identification data can specify an identity that is generated by the calling party and the caller identification data is intended to be representative of the calling party when presented to the customer by the called party device. The operations also can include determining an interface identifier associated with the communication interface. The operations also can include retrieving a call authentication scenario based on the interface identifier associated with the communication interface. The call authentication scenario can specify a storage location of data that is to be accessed. The operations also can include obtaining the data from the storage location specified by the call authentication scenario; determining the call handling action for the call; preparing a call handling command based on the call handling action; and providing the call handling command to a network from which the call is being routed. In embodiments, the call handling command directs the performance of the call handling action. In some embodiments, the call handling command can direct the network to perform the call handling action, at least in part, in response to the call handling command being provided to the network.

In some embodiments, the call handling action can include at least one of allowing the call to proceed to the called party device, preventing the call from proceeding to the called party device, sending the call to voicemail, ignoring the call, diverting the call, or any combination thereof. In some embodiments, the call handling action can include diverting the call to an unassociated target, and storing a call data record that documents the call being diverted to the unassociated target. In some embodiments, diverting the call to the unassociated target can be based on determining that the identity specified in the caller identification data is representative of the unassociated target despite the caller identification data being generated by the calling party device associated with the calling party, where the calling party is not associated with the unassociated target. In some embodiments, the operations can also include providing the call handling command to a usage server, where the call handling command directs the usage server to concatenate the caller identification data with the call data record that documents the call being diverted to the unassociated target.

In some embodiments, the operations can further include providing the call handling command to a usage server, where the call handling command directs the usage server to concatenate the caller identification data with the call data record that documents the call being diverted to the unassociated target. In some embodiments, the operations also can include generating the call authentication scenario. In some embodiments, generating the call authentication scenario can include obtaining, from a user device, call management data; creating a call authentication scenario based on the call management data; and storing the call authentication scenario. In some embodiments, the call management data can include a call authentication parameter; a data source identifier that identifies a data source that comprises the storage location of data to be accessed; customer account data that identifies a customer account associated with the called party device that is the intended recipient of the call; communication interface data that identifies the communication interface with which the call authentication parameter applies; and a call handling action identifier that defines one or more actions to be performed. In embodiments, the actions are to be performed in response to the call handling command being provided to the network when the call authentication parameter applies.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

Figure 1:
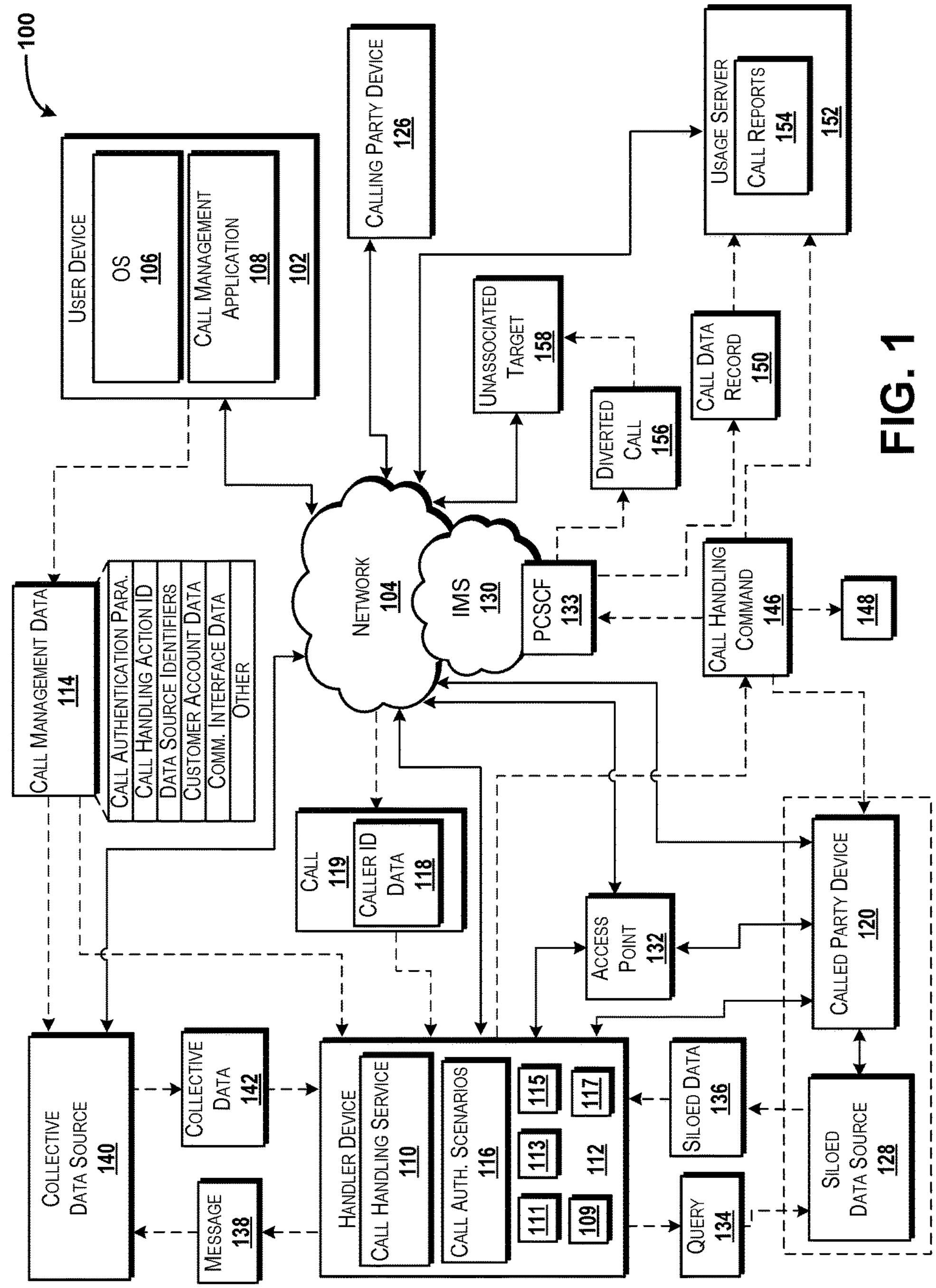
FIG. 1 is a system diagram showing an illustrative operating environment for various embodiments of the concepts and technologies described herein.

The following detailed description is directed to a call handling service that is configured to screen and authenticate caller identification data associated with a call from a calling party, and to route or otherwise handle the call. The call handling service can also be configured to prompt actions by other processors, servers, and/or entities, combinations thereof, or the like. A calling party can provide caller identification data ("caller ID data") via a communication service available in analog and digital phone systems as well as in most voice over Internet Protocol (VoIP) applications of a network. Caller ID data is intended to provide identifying information (e.g., a name, telephone number, etc.) about the calling party to the called party. The caller ID data can be provided to a communication device of the called party (referred to as the "called party device") as an audio and/or visual presentation of identifying information (e.g., displayed on a screen, announced via an audio speaker, and/or otherwise presented to the called party device).

In some instances, the caller ID data is presented on the called party device; however, the information being presented may be misleading, deceptive, and/or not accurately reflect the true identity of the calling party. This may be because the identifying information presented by the caller ID data has been "masked" and/or "spoofed". When the caller ID data is masked, the information displayed or otherwise presented on the called party device is displayed as "unavailable", "unknown caller", "wireless caller", or the like. When the caller ID data is "spoofed", the calling party has generated, supplied, or otherwise provided false, misleading, incorrect, fraudulent, and/or otherwise deceptive information about the identity of the calling party such that the caller ID data appears to the called party device as being a legitimate, known, and/or innocuous name and/or number to the user. As such, caller ID data that has been forged or otherwise spoofed can cause the screen and/or speaker of the called party device to present a number and/or name that is intended to appear valid and/or legitimate, but instead is an intentional misrepresentation of the actual identification associated with the called party device of the calling party. In some embodiments, the calling party can generate an instance of caller ID data that has been spoofed or otherwise forged via the use of a spoofing application that executes on the calling party device and/or as a spoofing service. The caller ID data can be customized by the calling party to include deceptive or misleading information, such as a name or phone number, or a close approximation of a name or phone number of a legitimate business or company that is not associated with the identity of the calling party (e.g., when the calling party deceptively appears to be the business "DirecTV" by intentionally misspelling the caller ID data to display "DirectTV").

Embodiments of the present disclosure provide a call handling service that can screen and authenticate caller ID data associated with a call being routed to the called party device. The call can be routed to the called party device via a variety of communication interfaces. In some embodiments, the call handling service can be hosted or executed on a computer system that includes one or more of the communication interfaces by which the call is routed. In some embodiments, the computer system is an intermediary device located between the network and an access point that communicates with the called party device. The call handling service can detect the call via a communication interface, obtain caller ID data and a call authentication scenario, and analyze the caller ID data and the call authentication scenario to determine how the call is to be handled. The call handling service can determine a call handling action and issue a call handling command to the network that can perform the call handling action. These and other aspects of the concepts and technologies disclosed herein will be illustrated and described in more detail below.

While some of the subject matter described herein may occasionally be presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types in response to execution on a processor. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and other particularized, non-generic machines.

Referring now to FIG. 1, aspects of an operating environment 100 for various embodiments of the concepts and technologies disclosed herein for providing and using a call handling service will be described, according to an illustrative embodiment. The operating environment 100 shown in FIG. 1 includes a user device 102 operating in communication with and/or as part of a communications network ("network") 104.

According to various embodiments, the functionality of the user device 102 may be provided by one or more server computers, desktop computers, mobile telephones, smartphones, tablet computers, laptop computers, smart watches, web browsers (e.g., browser-based implementations of communication devices), set-top boxes, vehicle computing systems, other computing systems, and the like. It should be understood that the functionality of the user device 102 can be provided by a single device, by two or more similar devices, and/or by two or more dissimilar devices. For purposes of describing the concepts and technologies disclosed herein, the user device 102 is described herein as a smartphone. It should be understood that this embodiment is illustrative, and should not be construed as being limiting in any way.

The user device 102 can execute an operating system 106 and one or more application programs such as, for example, a call management application 108. The operating system 106 can be a computer program for controlling the operation of the user device 102. The call management application 108 can be an executable program configured to execute on top of the operating system 106 to provide various functions as illustrated and described herein for interacting with and/or using a call handling service. According to various embodiments, the functionality of the call management application 108 can be provided by a web browser, a web application, and/or a standalone application. Thus, it can be appreciated that a web browser application can execute instructions to provide the functionality illustrated and described herein. Because the application programs can include other applications that are generally understood (e.g., mail programs, messaging programs, web browsing programs, standalone applications, combinations thereof, or the like), the example embodiment shown in FIG. 1 should not be construed as being limiting in any way the concepts and technologies described herein.

The call management application 108 can be configured to interact with an application, program, module, service, or other software such as a call handling service 110 to enable management, control, and/or use of the call handling service 110 and/or to interface with other entities to manage (or effect management of) the call handling service 110. In the illustrated embodiment, the call management application 108 can be used to interact with and/or control the call handling service 110, though this is not necessarily the case. The call handling service 110 can be a callable service executed and/or hosted by a computing system, such as a handler device 112. The handler device 112 will be described in more detail below.

The call management application 108 and the call handling service 110 can be configured to exchange various types of information with one another so as to provide, use, and/or control the call handling service 110 that can provide communication handling in accordance with the concepts and technologies described herein. According to various embodiments, the call management application 108 can be configured to collect and transmit to the call handling service 110 one or more instances of call management data 114. The call management application 108 can be used to create one or more instances of the call management data 114. The call management data 114 can include one or more call authentication parameters, one or more call handling action identifiers, one or more instances of customer account data, one or more data source identifiers, one or more instances of communication interface data, other information, combinations thereof, or the like. According to various embodiments of the concepts and technologies described herein, a user or other entity can interact with the call management application 108 and/or the call handling service 110 to create the call management data 114 and/or the components thereof, each of which is described in more detail below. Thus, it can be appreciated that a user or other entity can interact with the call handling service 110 via a web portal, a web application, a standalone application, and/or other executable software to create the call management data 114.

The call handling service 110 can be interacted with and/or configured by input from a user, a customer, a network operator, an administrator, or the like to create one or more call authentication scenarios 116. In some embodiments, the user device 102 can be used to facilitate the creation of the call authentication scenarios 116 by submitting the call management data 114 to (or exchanging with) the call handling service 110. The call authentication scenarios 116 can incorporate and/or otherwise include the call management data 114 that can be provided from the call management application 108. A call authentication scenario, such as the call authentication scenarios 116, can provide instructions for identifying and authenticating calls so as to facilitate and/or prompt the creating of commands and/or triggering actions or requests to other entities, processors, or the like in order to handle the calls. Further discussion of the creation of the call authentication scenarios 116 is illustrated and described in more detail hereinbelow with respect to FIG. 3.

In some embodiments, the call management data 114 can include various information that can be used to create and/or update the call authentication scenarios 116. For example, the call management data 114 can include one or more call authentication parameters, call handling action identifiers, data source identifiers, customer account data, communication interface data, other data, any combination thereof, or the like. It should be understood that this example is illustrative and therefore should not be construed as being limiting in any way. An example screen display for providing an embodiment of the call management data 114, as well as additional details related to the call management application 108 and the call management data 114, are illustrated and described in more detail below with reference to FIG. 2.

In some embodiments, the call management data 114 can include customer account data that identifies a customer account that is associated with a customer (also referred to herein as "a called party") that corresponds to a called party device 120. The customer may have a customer account with a network operator associated with the network 104 that can provide communication services for the called party device 120. The call management application 108 can receive login credentials from the customer associated with the called party device 120, and the login credentials can be referenced to the customer account associated with the customer. When the call management data 114 is sent to the call handling service 110, the customer account data can be included to identify the customer account associated with the called party device that can be the intended recipient of calls via the network 104. In some embodiments, the customer account data can be provided to a usage server 152 to collate and/or concatenate information about how a call is handled and the actions that are taken based on the direction of the call handling service 110. An illustration of an embodiment of the customer account data is provided with respect to FIG. 2 and will be described in more detail hereinbelow.

In some embodiments, the call management data 114 can include communication interface data. Communication interface data can include interface identifiers that are associated with a one or more communication interfaces. Communication interfaces can be used to facilitate transmission and/or routing of calls, such as call 119, from calling party devices, such as a calling party device 126, to a called party device, such as the called party device 120. The call handling service 110 can decide to handle or otherwise route calls differently based on the specific communication interface that is identified and used to send, route, or otherwise provide a call such as the call 119, to the called party device 120. In some embodiments, the communication interfaces (e.g., communication interfaces 109, 111, 113, 115, and/or 117) can be included in a computer system that hosts and/or otherwise executes the call handling service 110, such as the handler device 112.

In some embodiments, the communication interface data can include interface identifiers for one or more of the communication interfaces 109, 111, 113, 115, and/or 117. A communication interface (e.g., any of the communication interfaces 109, 111, 113, 115, and/or 117) can be associated with, for example, one or more of a voice over internet protocol, a plain old telephone service, a wireless local area network, a wireless wide area network, a software defined network controller, a combination thereof, or the like. The communication interface data can identify a communication interface associated with one of the call authentication scenarios 116 and defines a type of communication interface to which one or more of the call authentication scenarios 116 apply. Thus, the call handling service 110 can apply and use certain call authentication parameters in one of the call authentication scenarios 116 based on the communication interface that is identified by the communication interface data of the call management data 114. An illustration of an embodiment of the communication interface data is provided with respect to FIG. 2 and will be described in more detail hereinbelow.

In some embodiments, the call management data 114 can include one or more data source identifiers. The data source identifiers can identify, for one or more call authentication scenarios 116, data sources that are to be queried, accessed, or otherwise used when making determinations as to how a call, such as the call 119, should be handled. Thus, the data source identifiers can identify one or more data sources, services, or other resources that are to be accessed and/or used in determination of call handling actions that are to be implemented via a call handling command 146. The data source identifiers can identify the storage location of data that is to be accessed to facilitate the determination of how a call is to be handled. According to various embodiments, the data source identifiers therefore can identify one or more data sources, such as siloed data source 128 and/or collective data source 140, located remote from the call handling service 110. The data source identifiers can include uniform resource identifiers ("URIs) and/or uniform resource locators ("URLs"), file locations, access credentials, service locations, network locations, combinations thereof, or the like. When a call authentication scenario 116 is implicated by a particular incoming call (incoming to the network 104 and/or to the called party device 120), the data sources (e.g., the siloed data source 128 and/or the collective data source 140) associated with the data source identifiers can be accessed, queried, and/or otherwise interacted with to obtain the desired information. For clarity, a discussion of the siloed data source 128 and the collective data source 140 is provided following the discussion of the call management data 114. An illustration of an embodiment of a screen display for data source identifiers is provided with respect to FIG. 2 and will be described in more detail hereinbelow.

In some embodiments, the call management data 114 can include one or more call authentication parameters. A call authentication parameter can define, for one or more of the call authentication scenarios 116, one or more rules, options, settings, or preferences for handling communications, such as the call 119. A "call", such as the call 119, can include an audio call, a video call, an audio voicemail message, a visual voicemail message, and/or other live or recorded communications with data sessions that provide speech, sound, and/or video messages from the calling party device 126 to the called party via the called party device 120. The call authentication parameters of the call management data 114 can include rules of various types that define whether a specific call handling action should be invoked based on caller ID data 118 of the call 119. The caller ID data 118 can include a name and/or a number that represents an identity provided by the calling party device 126. In some embodiments, the call management data 114 can define multiple call authentication parameters, where each call authentication parameter corresponds with a different type of rule for authenticating the identity represented by the caller ID data 118. For example, the call authentication parameter can define one or more of a whitelist, a blacklist, a historical rule, a default rule, a rule for explicitly suspicious caller identification data, a spatial rule, an inverse throttling rule, a metadata rule, an explicit feedback rule, a schedule rule, a spoofing rule, a combination thereof, or the like. The call authentication parameters can define what call handling actions should be taken, and when a command, such as the call handling command 146, should be issued to direct implementation of the call handling action.

In some embodiments, one or more call authentication parameters can be invoked based on the call handling service 110 detecting that the type of communication interface (e.g., one of the communication interfaces 109, 111, 113, 115, and/or 117) being used to transmit and/or route the call 119 to the called party device 120. In some embodiments, the type of communication interface can be determined based on an interface identifier, and the type of communication interface can dictate how the call handling service 110 acquires the caller ID data 118. For example, if the communication interface transmitting and/or routing the call 119 is associated with a plain old telephone service, then the call handling service 110 can obtain the caller ID data 118 between the first and second ring of the call 119, and then apply the call authentication parameters corresponding to the call authentication scenario 116 assigned to the communication interface for the plain old telephone service. In another example, if the call 119 is being routed through a communication interface associated with voice over internet protocol, then the call handling service 110 can obtain the caller ID data 118 from metadata provided with data packets of the call 119. A detailed discussion of embodiments of the call authentication parameters is provided with respect to FIG. 2 and will be described in more detail hereinbelow.

In some embodiments, the call management data 114 can include one or more call handling action identifiers that can be included in the call handling command 146 based on the call authentication parameter of the call authentication scenario 116 being used. The call handling action identifiers correspond to the call handling actions that can proceed as a result of the implementation of a particular call authentication parameter of one of the call authentication scenarios 116. As such, a call handling action identifier can define one or more call handling actions to be performed in response to a call handling command (e.g., the call handling command 146) being provided to the network 104 when the call authentication parameter of the call authentication scenario 116 applies. An illustration of an embodiment of a screen display to select call handling actions for a specific call authentication scenario 116 via the use of a call handling action identifier is provided with respect to FIG. 2 and will be described in more detail hereinbelow.

Examples of call handling actions that can be defined and/or identified for implementation can include allowing the call 119 to proceed to the called party device 120; blocking or otherwise preventing the call 119 from proceeding to the called party device 120; sending the call 119 to voicemail; ignoring the call 119; diverting the call 119; allowing the call 119 after a defined number of repeated attempts to contact the called party device 120 (e.g., after 2, 5, 10 attempts); blocking the calling party associated with the caller ID data or otherwise preventing the call 119 from proceeding to the called party device 120 after a defined number of repeated attempts to contact the called party device 120 (e.g., after 2, 5, 10 attempts); instantiating a temporary block based on the caller ID data 118; notifying a collective data source (e.g., the collective data source 140) of the caller ID data 118 that was provided by the calling party device 126; blocking the call 119 within a defined time window (e.g., for the next 45 minutes, 6 hours, 1 week, etc.); muting the call 119 within a defined time window (e.g., for the next 45 minutes, 6 hours, 1 week, etc.); storing a record of handling actions taken; diverting the call 119 to an associated target (e.g., a voicemail, a mobile communication device, a landline, or other communication device that belongs to the called party and/or another person or entity associated with the called party); diverting the call 119 to an unassociated target (i.e., a communication device that is not associated with the called party but is associated with the bona fide identity of a person, company, and/or entity that was misrepresented by the caller ID data 118); or any combination thereof. It should be understood that these examples are illustrative and therefore should not be construed as being limiting in any way.

In some embodiments, the call handling action identifiers of the call management data 114 can define messages that are to be generated and/or to whom the messages are to be sent (e.g., SMS, MMS, email, and/or other messages and/or entities, devices, services, applications, and/or processors that are to receive the messages), processes and/or operations to be performed upon receiving or acting on a call 119, other network entities and/or functionality that is or are to be invoked upon detection, receipt, and/or interaction with the call 119, combinations thereof, or the like. Because the call handling action identifiers can define any desired actions and/or can entail any other entities, it should be understood that these examples are illustrative and therefore should not be construed as being limiting in any way.

In some embodiments, the call management data 114 can include other information. The other information can include other types of data that may be considered when the call handling service 110 is making decisions. Thus, the other information can include identifiers of parties associated with the called party device 120 (e.g., phone numbers, IP addresses, email addresses, or the like), organization information (e.g., identification of my boss, my assistant, etc.), family information (e.g., names and contact information for my son, my daughter, my wife, etc.), combinations thereof, or the like. In some embodiments, the other information can include access credentials for a data source, such as the siloed data source 128 and/or the collective data source 140. In some embodiments, the access credentials may be provided by the customer via the call management application 108 that can execute on the user device 102. These and other types of information can be used to determine how particular calls should be handled. Because the other information can include other types of information, it should be understood that this example is illustrative and therefore should not be construed as being limiting in any way.

The operating environment 100 can include the siloed data source 128 and the collective data source 140. As used herein, the phrase "data source" refers to a data storage device such as a database, a data server, a mass data storage device, or the like. In the embodiment shown in FIG. 1, the functionality of a data source (e.g., the siloed data source 128 and/or the collective data source 140) can be provided by one or more databases, data storage devices, server computers, desktop computers, mobile telephones, laptop computers, other computing systems, and the like. For purposes of illustrating and describing the various embodiments of the concepts and technologies described herein, the siloed data source 128 is illustrated and described herein as data hosted by the called party device 120, and the collective data source 140 is illustrated and described herein as data hosted by a server computer that is located remote from the call handling service 110. It should be understood that this example is illustrative and therefore should not be construed as being limiting in any way.

In some embodiments, the siloed data source 128 can be owned by a customer associated with the called party device 120. In embodiments, the siloed data source 128 is isolated and/or remote from the call handling service 110 and/or the collective data source 140. The siloed data source 128 can include a data storage device that stores siloed data 136. The siloed data 136 can include rules, logs, filters, whitelists, blacklists, and/or other information related to caller identification screening and handling of calls that are or have been performed locally by and/or on the called party device 120. In embodiments, the called party may have generated and/or initiated or caused the generation of the siloed data 136 in response to manual screening of calls that did not involve the call handling service 110 (i.e., independent of the call handling service 110). By this, the siloed data 136 can be isolated or "siloed" from the network 104. In some embodiments, the call management data 114 provided to the call handling service 110 by the call management application 108 can include access credentials to the siloed data source 128. The access credentials can be provided by the called party via the user device 102 and can authorize the call handling service 110 to remotely access the siloed data 136 of the siloed data source 128. As such, the siloed data 136 can be made available, via a designation and/or authorization by the called party, to the call handling service 110.

In embodiments, the siloed data 136 can be made available to the call handling service 110 without copying the siloed data 136 to a data storage device that is local to or otherwise associated with the call handling service 110, such as a memory of the handler device 112. In embodiments, this can be accomplished by the call handling service 110 receiving the call management data 114 that includes the data source identifiers. One of the data source identifiers can be associated with the siloed data source 128, and thus the call handling service 110 can be directed to query, request, and/or otherwise obtain an instance of the siloed data 136 and/or information about the siloed data 136 from the siloed data source 128. In the embodiment illustrated in FIG. 1, the call handling service 110 can generate one or more queries, such as a query 134, of the data source identified by one or more of the data source identifiers of the call management data 114 (e.g., the siloed data source 128 in FIG. 1). In some embodiments, the query 134 to the siloed data source 128 can present an access credential provided by the call management data 114 to access the siloed data 136. In some embodiments, the call handling service 110 obtains a message in response to the query 134, where the message includes an instance of the siloed data 136 and/or information about the siloed data 136 stored in the siloed data source 128. The call handling service 110 can use the siloed data 136 as a basis for determining what call handling action should be taken when a call with certain caller identification data is detected, such as the call 119 having the caller ID data 118. It should be understood that this example is illustrative and therefore should not be construed as being limiting in any way.

The operating environment 100 can include the collective data source 140 that can be in communication with the network 104. The collective data source 140 refers to one or more data storage devices that can store collective data 142. The collective data source 140 can receive, collate, concatenate, and/or otherwise assemble instances of information about specific caller identification data that are provided from multiple suppliers, such as communication devices, websites, customers, called party devices (e.g., the called party device 120), databases, network operators, or the like, so as to collectively assemble instances of when calls having the specific caller identification data were placed. Thus, the collective data source 140 can provide a community resource about calls associated with a specific name and/or number contained in caller ID data. The contents of the collective data source 140 can be updated as new calls are placed to communication devices. The call handling service 110 can access the collective data source 140 to retrieve the collective data 142 pertaining to an instance of caller ID data associated with a call, such as the caller ID data 118 associated with the call 119. In the embodiment illustrated in FIG. 1, the call handling service 110 can generate one or more messages, such as a message 138, of a data source (e.g., the collective data source 140 in FIG. 1) identified by one or more of the data source identifiers of the call management data 114. The call handling service 110 can obtain an instance of the collective data 142 from the collective data source 140 in response to the message 138. The collective data 142 can service as a basis for the call handling service 110 to use in determining what call handling action should be taken when a call with certain caller identification data is detected, such as the call 119 having the caller ID data 118. It should be understood that this example is illustrative and therefore should not be construed as being limiting in any way.

The operating environment 100 can include the handler device 112 that can execute or otherwise host the call handling service 110 via a processor. In embodiments, the handler device 112 is a non-generic computer system that can be configured by execution of the call handling service 110. The handler device 112 can include a data storage device that stores the call handling service 110 and one or more of the call authentication scenarios 116. The handler device 112 can be in communication with the network 104, the collective data source 140, the siloed data source 128, the called party device 120, one or more access point 132, combinations thereof, or the like.

In embodiments, the handler device 112 can include one or more communication interfaces, such as the communication interfaces 109, 111, 113, 115, and 117, of the same or different type. The communication interfaces 109, 111, 113, 115, and 117 can facilitate communication between the network 104 and the called party device 120 for the call handling service 110. As used herein, the phrase "communication interface" refers to software and/or hardware components that can facilitate the transmission and communication of calls and information about calls to and/or from the call handling service 110. In embodiments, each of the communication interfaces 109, 111, 113, 115, and 117 corresponds with a different type of communication interface. For example, in an embodiment, the communication interface 109 can be associated with a plain old telephone service and can receive and/or send communications via a plug and/or socket (e.g., a registered jack network interface); the communication interface 111 can be associated with a voice over internet protocol and can receive and/or transmit communications via a plug and/or socket (e.g., registered jack network interface and/or a fiber optic interface); the communication interface 113 can be associated with a wireless local area network connection (e.g., a Bluetooth and/or a WiFi network connection that complies with 802.11 standards) and can receive and/or send communications via a wireless network interface controller; the communication interface 115 can be associated with a wireless wide area network and can receive and/or send communications via a radio transceiver (e.g., a connection to a Long-Term Evolution network, a Worldwide Interoperability for Microwave Access network, a Global System for Mobile Communications network, a Cellular Digital Packet Data network, Universal Mobile Telecommunications System network, or the like); and the communication interface 117 can be associated with a software defined network (SDN) controller (e.g., a SDN application and/or container of the call handling service 110 that can communicate with an SDN controller within the network 104 so as to receive call signaling requests for the call 119 and the caller ID data 118 and send a call handling command in response to handle the call 119). It should be understood that this example is illustrative and therefore should not be construed as being limiting in any way.

In an embodiment, the handler device 112 can take the form of a pass-through dongle that executes or otherwise hosts the call handling service 110. The phrase "pass-through dongle" refers to a non-generic, particular computer system that is situated between the network 104 and the called party device 120 so as to receive, detect, intercept, handle and/or otherwise provide the functionality of the call handling service 110 prior to an incoming call (e.g., the call 119) being received by, presented to, and/or answered by the called party device 120. In some embodiments, the pass-through dongle can communicate (via wired and/or wireless communication links) with the access point 132, which in turn is in communication with the called party device 120. The pass-through dongle can be a separate computing system that can draw power independently and/or from another device, such as the access point 132. In some embodiments, the pass-through dongle that executes the call handling service 110 can act as an intermediary between the network 104 and the called party device 120. By this, in some embodiments, the pass-through dongle can include two or more communication interfaces of the same type, where one communication interface receives communications (e.g., the call 119) from the network 104 and another communication interface sends, transmits, or otherwise provides communications (e.g., the call 119 and/or the call handling command 146) to the access point 132, the called party device 120, and/or the network 104. In an embodiment, the access point 132 is included within the handler device 112 that takes the form of the pass-through dongle. It should be understood that this example is illustrative and therefore should not be construed as being limiting in any way.

The operating environment 100 can include one or more of the access point 132 that can communicate with the call handling service 110 of the handler device 112, the called party device 120, and/or the network 104. One or more of the access point 132 can be wired and/or wireless and can include a base station, a wireless router, a femtocell, or other network interface nodes that can facilitate communication between and/or among the call handling service 110, the called party device 120 and/or the network 104. It should be understood that this example is illustrative and therefore should not be construed as being limiting in any way.

To provide the functionality illustrated and described herein, the call handling service 110 can receive the call management data 114 and generate (or create), based upon the call management data 114, one or more call authentication scenarios, such as the call authentication scenarios 116. The call authentication scenarios 116 can define the rules by which to handle inbound calls for a particular called party device, such as the called party device 120, based upon the communication interface 109, 111, 113, 115, and/or 117 of the handler device 112 that is used to detect the inbound call, such as the call 119; the siloed data 136; the collective data 142; the call management data 114 (including any of the call authentication parameters, the call handling action identifiers, the data source identifiers, the customer account data, the communication interface data, and/or other data); combinations thereof, or the like. In some embodiments, the call handling service 110 can detect that the call 119 is being transmitted and/or routed to the called party device 120 prior to the called party device 120 notifying the user that the call 119 has been received and/or prior to the call 119 being received by the called party device 120. In some embodiments, this is accomplished by the call handling service 110 being executed on the handler device 112, which is an intermediary between the called party device 120 and the network 104, thereby causing the call handling service 110 to handle the call 119 (e.g., by receiving the call 119 from the network 104) before the call 119 reaches the called party device 120. In some embodiments, the handler device 112 is located downstream of the network 104 and upstream of an access point, such the access point 132, and the called party device 120. The call authentication scenarios 116 can be relevant to one or more users, accounts, devices, or the like, for example the called party device 120, and can be stored by the call handling service 110 in a data storage device of the handler device 112.

The calling party device 126 can place the call 119 that is intended for the called party device 120. In the embodiment illustrated in FIG. 1, the operating environment 100 can include an Internet Protocol multimedia subsystem ("IMS") 130 of the network 104. According to various embodiments, the call 119 or other communications initiated or otherwise placed by the calling party device 126 can occur and/or be controlled via the IMS 130 for transmission and/or routing to another device (e.g., the called party device 120). The IMS 130 can include a proxy call session control function ("PCSCF") 133. According to various embodiments of the concepts and technologies described herein, the PCSCF 133 can route communications (e.g., the call 119, a diverted call 156, the call handling command 146, and/or a call data record 150) from, among, and/or between devices (e.g., the calling party device 126, the handler device 112, the called party device 120, the access point 132, an unassociated target 158, a network entity 148, and/or the usage server 152) in accordance with various rules and/or in accordance with the call authentication scenarios 116. Because the IMS 130 is generally understood, the IMS 130 is not further described herein.

At some point in time, the call handling service 110 can detect the call 119 via an interface identifier corresponding to one of the communication interface (e.g., any of the communication interfaces 109, 111, 113, 115, and/or 117) that is being used to transmit and/or route the call 119. The call handling service 110 can detect that the call 119 is received from a device operating on the network 104 (e.g., a call routing server), a device operating on the IMS 130 (e.g., the PCSCF 133), the called party device 120, the calling party device 126, combinations thereof, or the like. It should be understood that this example is illustrative and therefore should not be construed as being limiting in any way.

The call handling service 110 can obtain the caller ID data 118 that is associated with the call 119. For example, the caller ID data 118 can be obtained between a first and second ring for a plain old telephone service, or from a message sent by the network 104. The caller ID data 118 can specify an identity that is generated by the calling party via the calling party device 126 and/or a caller identification service provided within the network 104. In some embodiments, the calling party can alter, spoof, or otherwise misrepresent the identity (e.g., the name and/or number) that is assigned to or actually represents the calling party device 126 by the communication provider for the calling party device 126. The caller ID data 118 can be configured, altered, and/or customized by the calling party, such as via the calling party device 126, so as to be representative of the calling party and/or representative of, or approximately representative of, the unassociated target 158 when presented to the customer using the called party device 120. As such, in some embodiments, the identity generated by the calling party can portray (e.g., through misrepresentation and/or spoofing of the caller ID data 118) that the call 119 is originating from the unassociated target 158 even though the call 119 actually originated from or on behalf of the calling party device 126. The unassociated target 158 can be a computer system associated with a person, business, government entity, school, another entity, or the like, that is not actually associated with the calling party of the calling party device 126. However, the caller ID data 118 may appear as though the call 119 is being placed by the unassociated target 158, despite the call actually being placed by the calling party and originating from the calling party device 126.

The call handling service 110 can determine an interface identifier associated with the communication interface that is handling and/or being used to route the call 119, such as one of the communication interfaces 109, 111, 113, 115, and/or 117. A communication interface 109, 111, 113, 115, and/or 117 may be assigned a specific interface identifier, and the call handling service 110 can pull the interface identifier from a memory when the corresponding communication interface 109, 111, 113, 115, and/or 117 is used to handle and/or route the call 119. The call handling service 110 can retrieve one of the call authentication scenarios 116 based on the interface identifier that is determined to correspond with the specific communication interface 109, 111, 113, 115, and/or 117 in use to transmit and/or route the call 119. The call authentication scenario 116 can be retrieved based on, for example, the interface identifier and/or customer account data from the call management data 114. The call authentication scenario 116 can incorporate one or more call authentication parameters from the call management data 114, and thus the call authentication scenario 116 can specify the particular call authentication parameter by which to analyze the caller ID data 118 and determine how the call 119 should be treated, such as by issuing a call handling action.

In embodiments, the call authentication scenario 116 specifies a storage location of data that is to be accessed. The call handling service 110 can obtain data from the storage location specified by the call authentication scenario 116. For example, the call authentication scenario 116 can specify that the siloed data source 128 and/or the collective data source 140 are storage locations that are to be accessed in order to obtain data (e.g., the siloed data 136 and/or the collective data 142) contained therein. The call handling service 110 can determine how the call 119 will be handled by analyzing information pertaining to the caller ID data 118 and determining the appropriate action that should be taken. For example, the call handling service 110 can determine a call handling action by analyzing the caller ID data 118, the siloed data 136, the collective data 142, and/or the call authentication scenario 116. As discussed in additional detail with respect to FIG. 2, the call authentication scenario 116 can include call authentication parameters that have rules defining how the caller ID data 118 should be treated and what call handling action should be taken in response to a call authentication parameter indicated by the call authentication scenario 116. In some embodiments, for example, the call handling actions can include allowing the call 119 to proceed to the called party device 120, preventing the call 119 from proceeding to the called party device 120, sending the call 119 to voicemail, ignoring the call 119, diverting the call 119, a combination thereof, or the like, although this may not necessarily be the case. It should be understood that the examples are illustrative and therefore should not be construed as being limiting in any way.

After determining how the call 119 will be handled, the call handling service 110 can prepare a call handling command, such as the call handling command 146, to effect handling and/or routing of the call 119 and/or performance of another action in accordance with the determined one or more call handling actions. The call handling service 110 can prepare the call handling command 146 based on the call handling action, the caller ID data 118, the data from a storage location of a storage device (e.g., siloed data 136 from the siloed data source 128 and/or the collective data 142 from the collective data source 140), the call authentication scenario 116, a combination thereof, or the like. The call handling service 110 can prepare the call handling command 146 by generating a message and/or package that can include executable instructions and/or pointers that directs another device to perform the determined call handling action and/or other actions once the device receives the call handling command 146. For example, in an embodiment, the call handling command 146 can be prepared for transmission to the called party device 120. In another embodiment, for example, the call handling command 146 can be prepared for a particular device, system, and/or subsystem of the network 104, such as for the PCSCF 133. The PCSCF 133 can be configured to follow the directions provided by the call handling command 146 and/or trigger functionality to implement the call handling action directed by the call handling command 146. For example, the call handling service 110 can prepare the call handling command 146 with instructions that direct the PCSCF 133 of the IMS 130 in the network 104 to divert or otherwise forward the call 119 to the unassociated target 158. In this example, the call handling command 146 directs the PCSCF 133 to divert or otherwise forward the call 119 to the unassociated target 158, instead of to the called party device 120 of the called party, because the call authentication scenario 116, the siloed data 136, and/or the collective data 142 indicated that the identity provided by the caller ID data 118 is not representative of the identity of the calling party, but instead is a misrepresentation or spoof of an identity of the unassociated target 158 in an attempt, by the calling party, to mislead the called party into believing that the call 119 is from the unassociated target 158. As such, by preparing the call handling command 146 with instructions to divert the call 119 to the unassociated target 158 having the identity that is being misrepresented/spoofed by the calling party, the call handling service 110 can reduce the number of misleading, misrepresented, or otherwise unwanted calls to the called party device 120 and can inform the unassociated target 158 that the calling party, using the calling party device 126, is pretending to have the identity of the unassociated target 158.

The call handling service 110 can issue the call handling command 146 by providing the call handling command 146 to one or more recipients. For example, in some embodiments, the call handling command 146 can be provided to the network 104 from which the call 119 was routed from and received and/or detected by the call handling service 110. According to various embodiments of the concepts and technologies described herein, the call handling service 110 provides the call handling command 146 to the PCSCF 133 of the IMS 130 associated with the network 104, and the PCSCF 133 applies the determined call handling command 146 to effect the determined call handling action. For example, the PCSCF 133 can, based on the call handling command 146, divert the call 119 from the original intended recipient (i.e., the called party device 120) to the unassociated target 158 in response to the call handling service 110 determining that the caller identification data 118 is not representative of the identity of the calling party, but instead is a misrepresentation or spoof of an identity of the unassociated target 158 in an attempt, by the calling party, to mislead the called party into believing that the call 119 is from the unassociated target 158.

In response to the instructions from the call handling command 146, the PCSCF 133 can initiate a diverted call, such as the diverted call 156, to the unassociated target 158. In embodiments, when a call is routed and/or handled by the network 104, such as the call 119 and/or the diverted call 156, a call data record, such as the call data record 150, can be generated and sent to a usage server, such as the usage server 152. The usage server 152 may generate a call report 154 that provides a summary and/or listing of communication activities associated with the called party device 120. As illustrated in FIG. 1, the call data record 150 can include activity information that logs when the PCSCF 133 of the network 104 diverted the call 119 from the called party device 120 and initiated the diverted call 156 to the unassociated target 158.

To allow the customer of the called party device 120 to understand the actions taken by the call handling service 110, in some embodiments, the call handling service 110 can also provide the call handling command 146 to the usage server 152. In embodiments, the call handling command 146 can be prepared by the call handling service 110 so as to direct the usage server 152 to prepare the call report 154 and concatenate, for inclusion in the call report 154, the call data record 150 (received from the network 104) with, for example, information about what action was taken (e.g., by a call handling action identifier corresponding to the action requested to be performed in the call handling command 146), the caller ID data 118 of the call 119, the identification of the call authentication scenario 116 that was used, and/or the customer account data from the call management data 114 that can be included in the call handling command 146. The call handling command 146 can direct the usage server 152 to store the call report 154 in a data storage device. In some embodiments, the call report 154 is provided to a customer of the called party device 120 as part of a period billing summary and/or service usage summary. By this, the call report 154 can enable the customer to quantify the effectiveness of the call handling service 110, such as by showing how often unwanted calls are blocked, diverted, muted, and/or otherwise handled by the call handling service 110 on behalf of the customer of the called party device 120.

Additionally, as shown in FIG. 1, in some embodiments the call handling command 146 can be passed to another network entity, such as the network entity 148, such as a processor, a messaging platform, an administrator device, or the like in addition to, or instead of, being passed to the PCSCF 133. The other network entity 148 can perform various actions, trigger various generation of call records, and/or process the call handling command 146 according to the instructions contained therein. Thus, it can be appreciated that the other network entity 148 can include a short message service center ("SMSC"), multimedia message service center ("MMSC"), an email server, a messaging platform, or the like, which can generate, trigger, and/or send one or more messages to various recipients in response to receiving the call handling command 146.

FIG. 1 illustrates one user device 102, one network 104, one handler device 112, one calling party device 126, one called party device 120, one siloed data source 128, one collective data source 140, one access point 132, one IMS 130, one PCSCF 133, one network entity 148, one unassociated target 158, and one usage server 152. It should be understood, however, that various implementations of the operating environment 100 can include zero, one, or more than one user device 102; zero, one, or more than one network 104; zero, one, or more than one handler device 112; one, or more than one calling party device 126; zero one or more called party device 120; zero, one, or more than one siloed data source 128; zero, one, or more than one collective data source 140; zero, one, or more than one IMS 130; zero, one, or more than one PCSCF 133; zero, one, or more than one network entity 148; zero, one, or more than one unassociated target 158; and zero, one, or more than one usage server 152. As such, the illustrated embodiment should be understood as being illustrative, and should not be construed as being limiting in any way.

Figure 2:
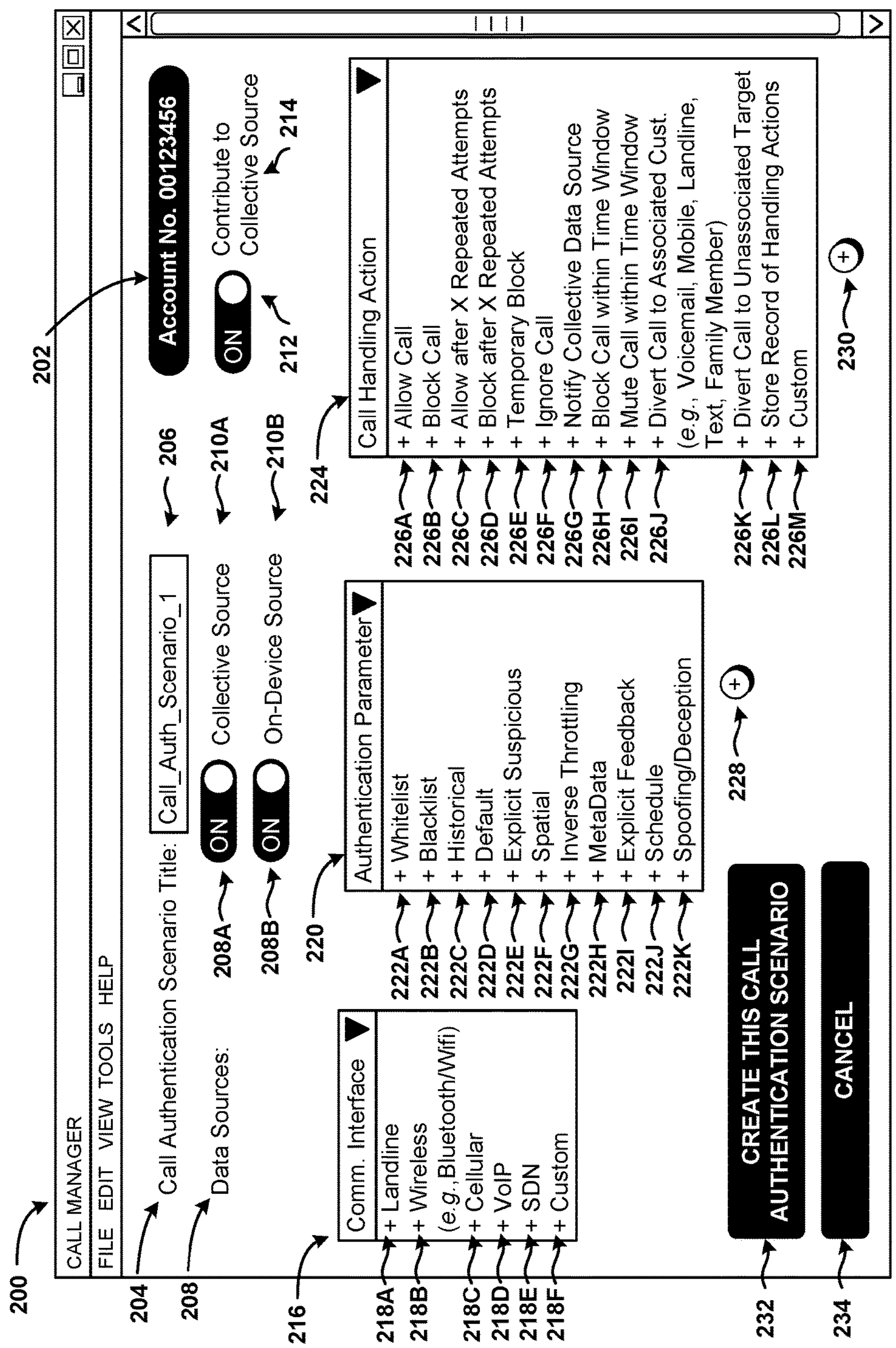
FIG. 2 is a user interface diagram showing an example screen display for providing call management data so as to interact with a call handling service, according to an illustrative embodiment of the concepts and technologies described herein.

Turning now to FIG. 2, a user interface ("UI") diagram showing an example screen display for providing call management data so as to interact with the call handling service 110 will be discussed, according to an illustrative embodiment of the concepts and technologies described herein. FIG. 2 shows an illustrative screen display 200, which can be generated by a device, such as the user device 102 and/or the called party device 120, via execution of the call management application 108. According to various embodiments, the user device 102 can generate the screen display 200 and/or other screen displays in conjunction with and/or based upon interactions with the call handling service 110 described herein (e.g., via rendering web data provided by a web portal exposed by the call handling service 110, or the like). It should be appreciated that the UI diagram illustrated in FIG. 2 is illustrative of one contemplated example of the UIs that can be generated and/or displayed in accordance with the concepts and technologies disclosed herein, and therefore should not be construed as being limited in any way.

According to various embodiments, the screen display 200 can be presented, for example, during interactions between a customer and/or an administrator and the call handling service 110, such as, for example, during creation of a call authentication scenario, such as the call authentication scenario 116, discussed further below with reference to FIG. 3. The screen display 200 also (or alternatively) can be presented in response to detecting a request to modify or edit the call authentication scenario 116 (or rules defined by call authentication parameters included therein), in response to a request to set preferences and/or settings associated with the call handling service 110 and/or one or more of the call authentication scenarios 116, or at other times. As such, the screen display 200 can be considered a display screen for providing the call authentication scenarios 116 used in the call handling service 110. Because the screen display 200 illustrated in FIG. 2 can be displayed at additional and/or alternative times, it should be understood that these examples are illustrative and therefore should not be construed as being limiting in any way.

As illustrated in the embodiment shown in FIG. 2, the screen display 200 can be configured to allow the customer associated with the called party device 120 or other entity to control various options associated with the call handling service 110 provided to the called party device 120 and/or one or more options associated with the call authentication scenario 116 associated with the called party device 120. As shown in FIG. 2, the screen display 200 pertains to the creation and/or modification of the call authentication scenario 116 for the call handling service 110. The screen display 200 can include a number of fields and/or controls, which are described in more detail below.

For example, the screen display 200 can include a call authentication scenario title field 204. A customer can enter a name for the call authentication scenario 116 in the call authentication scenario title field 204. When the call authentication scenario 116 is created, the name entered in the call authentication scenario title field 204 can be saved as a title 206 for the call authentication scenario 116. Similarly, the screen display 200 can include customer account data 202. The customer account data 202 can be associated with the customer and/or the called party device 120 associated with the customer. The customer account data 202 can include information identifying the customer, the called party device 120 associated with the customer, a subscription to the call handling service 110 associated with the customer, or any other information that can identify the call authentication scenario 116 as being associated with the customer and/or the called party device 120. For example, the customer account data 202 can define a unique string of characters by which to associate the call authentication scenario 116 with the called party device 120. In some embodiments, the call handling service 110 is activated based on the customer account data 202 corresponding to a subscription to the call handling service 110. It should be understood that this example is illustrative and therefore should not be construed as being limiting in any way.

The screen display 200 also can include a data sources section 208 that provides one or more data source identifier controls 208A, 208B for data source identifiers 210A, 210B, respectively. Specifically, in an embodiment, the data source identifier control 208A corresponds with the data source identifier 210A for the collective data source 140. The data source identifier control 208B corresponds with the data source identifier 210B for the siloed data source 128. The data source identifier controls 208A, 208B can be used to enable or disable an option for the call handling service 110 to retrieve data from the respective data sources, such as the siloed data 136 from the siloed data source 128 and/or the collective data 142 from the collective data source 140. In some embodiments, the screen display 200 also can include a contribution control 212 to authorize sharing of the call authentication scenario 116 with a data source identifier labeled in the title field 214, which may also correspond with the collective data source 140. This can allow the call authentication scenario 116 to be shared with a community of other subscribers to the call handling service 110.

A user can interact with the data source identifier controls 208A, 208B, the contribution control 212, a communication interface selector 216, a call authentication parameter selector 220, and/or a call handling action selector 224 to specify one or more options or settings associated with a call authentication scenario, such as the call authentication scenario 116, being created or modified using the call handling service 110 and/or the call management application 108. According to various embodiments, the data source identifier controls 208A, 208B, the contribution control 212, the communication interface selector 216, the call authentication parameter selector 220, and/or the call handling action selector 224 can be replaced with toggles, fields, check boxes, dropdown boxes, and/or other controls for setting or controlling routing service settings. As such, it should be understood that various relative and/or absolute schemes or systems can be used to specify grades, weights, values, combinations thereof, or the like. Because various absolute and/or relative value schemes are possible and are contemplated, it should be understood that the above-mentioned ranking values and scales are illustrative and therefore should not be construed as being limiting in any way.

In the illustrated embodiment, the communication interface selector 216 can be used to enable or disable an option to identify a particular communication interface for which the call authentication scenario 116 will apply for calls being routed or otherwise transmitted through the communication interface. The communication interface selector 216 can include a selectable list of interface identifiers 218A-218F. In embodiments, at least one of the interface identifiers 218A-218F corresponds to one of the communication interfaces of the handler device 112 (e.g., one of the communication interfaces 109, 111, 113, 115, and/or 117). In an embodiment, the interface identifiers 218A, 218B, 218C, 218D, and 218E correspond with communication interfaces 109, 111, 113, 115, and 117, respectively. Thus, for example, a customer may specify, via the communication interface selector 216, that incoming calls through a particular communication interface should be handled by one of the call authentication scenarios 116, and thus one or more of the interface identifiers 218A-218F corresponding to the particular communication interface would be selected.

In the illustrated embodiment, the call authentication parameter selector 220 can be used to select one or more call authentication parameters 222A-222K so as to enable and/or disable the implementation of rules that define how a call should be handled and when one or more call handling action identifiers 226A-226M should apply. In some embodiments, the call handling service 110 can update and/or supplement information provided by the call management application 108 via the call management data 114. In embodiments, a customer interacting with the screen display 200 can use the call authentication parameter selector 220 to trigger one or more of the call authentication parameters 222A-222K to apply to a specific communication interface via the interface identifiers 218A-218E. In the illustrated embodiment, the call handling action selector 224 can be used to associate one of the call authentication parameters 222A-222K with one or more of the call handling action identifiers 226A-226M.

For example, the call authentication parameter 222A can correspond with a whitelist rule that can define a whitelist including a list of names and/or numbers whose calls are allowed to proceed to the called party device 120. The names and/or number can be entered by the customer and/or obtained from a data source, such as the siloed data source 128 and/or the collective data source 140. The names and/or numbers contained in the whitelist have an identity that is known and/or accurate. The call authentication parameter 222A can be associated with an action of allowing calls, such as the action corresponding to the call handling action identifier 226A, that allows a call associated with the caller ID data corresponding to a name and/or number defined by the call authentication parameter 222A to proceed to the called party device 120. The call authentication parameter 222B can correspond with a blacklist rule that can define a blacklist including a list of names and/or numbers whose calls are not permitted or otherwise allowed to proceed to the called party device 120. As such, the call authentication parameter 222B can be associated with an action of blocking calls, such as the action corresponding with the call handling action identifier 226B, that blocks a call associated with call ID data corresponding to a name and/or number defined by the call authentication parameter 222B. It should be understood that this example is illustrative and therefore should not be construed as being limiting in any way.

The call authentication parameter 222C can correspond with a historical rule that can define a list of names and/or numbers whose calls, after a defined number of repeated attempts at reaching the called party device 120, are either allowed to proceed to the called party device 120 or are blocked from proceeding to the called party device 120. As such, the call authentication parameter 222C can be associated with an action of allowing a call associated with caller ID data that corresponds to a name and/or number defined by the call authentication parameter 222C to proceed to the called party device 120 after a predefined number of repeated attempts, such as the action corresponding with the call handling action identifier 226C, or can be associated with an action of blocking a call associated with caller ID data that corresponds to a name and/or number defined by the call authentication parameter 222C from proceeding to the called party device 120 after a predefined number of repeated attempts, such as the action corresponding with the call handling action identifier 226D. It should be understood that this example is illustrative and therefore should not be construed as being limiting in any way.

The call authentication parameter 222D can correspond with a default rule that can be customized by the customer. For example, the call authentication parameter 222D can define a rule including a whitelist of names and/or numbers whose calls are allowed to proceed to the called party device 120, but if the call associated with the caller ID data is not on the whitelist, is suspicious, and/or is unknown to the called party device 120, then the call is allowed to proceed to the called party device 120 once and is blocked after an additional repeated attempt, such as the action corresponding with the call handling action identifier 226D. It is understood that the customer can change, update, or otherwise define the default rule associated with the call authentication parameter 222D, thereby allowing for combinations of actions associated with various call handling action identifiers 226A-226M. It should be understood that this example is illustrative and therefore should not be construed as being limiting in any way.

The call authentication parameter 222E can correspond with an explicitly suspicious rule that directs the call handling service 110 to analyze the name and/or number of the caller ID data 118 and determine whether the name and/or number is suspicious due to the content and/or sequence of characters in the name and/or number. For example, the name in the caller ID data 118 may contain a hyphen where a typical and/or known spelling of the name does not contain the hyphen. As a further example, the name in the caller identification data may be misspelled, such as when the name "DIRECTV" is misspelled as "DIRECTTV" or "DIRECT-TV". As such, the call authentication parameter 222E can be associated with the same call handling action identifiers as defined by the call authentication parameter 222D, such as the call handling action identifiers 226A and 226D. It is understood that alternate call handling actions can be designated, such as the call handling action identifier 226K that diverts a call determined to be suspicious to an unassociated target, such as the unassociated target 158. It should be understood that this example is illustrative and therefore should not be construed as being limiting in any way.

The call authentication parameter 222F can correspond with a spatial rule that directs the call handling service 110 to determine whether calls having the same caller identification data, such as the caller ID data 118, have been placed to telephone numbers that are similar and/or within a defined number of characters in separation from the telephone number (or other identifier) of the called party device 120. If so, then the call handling service 110 can identify that a calling party device associated with the calls, such as the calling party device 126, is robodialing (i.e., repeatedly dialing telephone numbers of communication devices according to a predefined order or sequence). As such, the call authentication parameter 222F can be associated with the call handling action identifier 226E that provides a temporary block of calls that provide the indicated caller identification data, such as the caller ID data 118, but would otherwise be allowed to proceed. It should be understood that this example is illustrative and therefore should not be construed as being limiting in any way.

The call authentication parameter 222G can correspond with an inverse throttling rule that directs the call handling service 110 to determine whether the calling party device 126 has exceeded a threshold number of outbound calls in a defined time period (e.g., exceeds 10,000 calls in a 24 hour period). If so, then the call authentication parameter 222G can direct the call handling service 110 to apply a call handling action, such as indicated by the call handling action identifier 226E that temporarily blocks otherwise allowable calls and also to apply the call handling action identifier 226G that can notify the collective data source 140 of the caller ID data indicating that throttling should be applied to the calling party device 126. In some embodiments, the call handling action identifier 226G can be implemented in other call authentication parameters 222A-222K, and can be used to update the collective data source 140 as to actions taken by the call handling service for calls associated with particular caller identification data. It should be understood that this example is illustrative and therefore should not be construed as being limiting in any way.

The call authentication parameter 222H can correspond with a metadata rule that directs the call handling service 110 to analyze a meta-tag associated with and/or provided by the caller ID data 118. If the meta-tag includes a string of characters that is known to be undesired by the called party device 120, such as indicating the phrase "political" or "sales", then the call authentication parameter 222H can direct the call handling service 110 to implement a call handling action, such as call handling action identifier 226B that blocks the call, the call handling action identifier 226H that blocks the call for a defined time window (e.g., for 24 hours), and/or the call handling action identifier 226F that allows the called party device 120 to ignore the call. It should be understood that this example is illustrative and therefore should not be construed as being limiting in any way.

The call authentication parameter 222I can correspond with an explicit feedback rule that prompts the called party device 120 with the caller ID data 118 and requests the customer to provide feedback as to what call handling action should be taken. For example, the call authentication parameter 222I can provide a prompt to the called party device 120 and in response, receives an instruction to block the call and notify the community of the calling party and/or the caller ID data 118 associated with the calling party device 126. The call authentication parameter 222I can be associated with the call handling action identifier 226B for blocking the call as well as the call handling action identifier 226G for notifying the community via upload of the caller ID data 118 to the collective data source 140. It should be understood that this example is illustrative and therefore should not be construed as being limiting in any way.

The call authentication parameter 222J can correspond with a scheduling rule that identifies the time a call, such as the call 119, or communication is permitted to be received by the called party device 120, such as a specific time of day, a day of the week, or combinations thereof. If the call 119 falls within the time permitted by the scheduling rule, then the call authentication parameter 222J instructs the call handling service 110 to implement a call handling action, such as the action associated with the call handling action identifier 226A that allows the call 119 to proceed to the called party device 120. If the call 119 does not fall within the time permitted by the scheduling rule, then the call authentication parameter 222J instructs the call handling service 110 to implement a call handling action, such as the action associated with the call handling action identifier 226H, that blocks the call 119 when the call is received outside the time permitted by the scheduling rule. It should be understood that this example is illustrative and therefore should not be construed as being limiting in any way.

The call authentication parameter 222K can correspond with a rule for handling spoofing, misrepresentation, and/or deception due, for example, to the specific sequence and presentation of the name and/or number of the caller ID data 118 in an attempt to mislead the called party into believing that a call, such as the call 119, associated with the caller identification data 118 is from an unassociated target, such as the unassociated target 158, instead of from the calling party associated with the calling party device 126 that actually placed the call. Put simply, the call authentication parameter 222K may analyze for deceptive, false, or otherwise misleading caller ID data 118 that indicates spoofing has occurred. For example, the call authentication parameter 222K can direct the call handling service 110 to perform a Bayesian statistical analysis between the name identified in the caller ID data 118 and that of a name for the unassociated target 158. The unassociated target 158 may be a computer server that is operated by an entity with the name "DIRECTV". In this example, the name provided in the caller ID data 118 may identify that the calling party device 126 is associated with the name "DIRECT-TV" or "DIRECT_TV", even though the calling party device 126 is in no way affiliated with the unassociated target 158. Thus, the calling party device 126 misrepresents the actual identity of the calling party device 126. Using the call authentication parameter 222K, the call handling service 110 can determine that the name and/or number provided by the caller ID data 118 indicates deception and/or misrepresentation due to a statistical analysis revealing similarities between the name and/or number provided by the caller ID data 118 and the name and/or number associated with the unassociated target 158 (e.g., a statistical likelihood indicating a likelihood above a pre-defined threshold that the names are similar, such as above 70% likelihood). If the caller ID data 118 indicates deception and/or misrepresentation, then the call authentication parameter 222K can instruct the call handling service 110 to prepare a call handling command 146 that directs the performance of a call handling action, such as the action associated with the call handling action identifier 226K for diverting the call 119 to the unassociated target 158 and/or the action associated with the call handling action identifier 226L for storing a record of one or more handling actions taken based on the caller ID data 118 (e.g., sending the call handling command 146 to the usage server 152). It should be understood that this example is illustrative and therefore should not be construed as being limiting in any way.

In some embodiments one of the call authentication parameters 222A-222K can be associated with the call handling action identifier 226I that mutes the call when the call is received within a defined window but otherwise allows the call to proceed to the called party device 120. One of the call authentication parameters can be associated with the call handling action identifier 226J for diverting the call to a device associated with the called party device 120 (thus considered an "associated customer") such as another communication device, a landline, a voicemail service, conversion of the call to a text message, and/or diverting the call to a family member associated with the customer of the called party device 120. It should be understood that in some embodiments, a customer can define a custom call handling action via the use of the call handling action identifier 226M. Because additional and/or alternative call authentication parameters and/or call handling action identifiers can be included in the screen display 200, it should be understood that the example embodiment shown in FIG. 2 is illustrative and therefore should not be construed as being limiting in any way.

The screen display 200 also can include an option 228 to add a call authentication parameter to the call authentication scenario being created. For example, the customer may have originally added the call authentication parameter 222A to apply in defined circumstances. The option 228 can allow for the call authentication scenario to include the call authentication parameter 222K. It should be understood that this example is illustrative and therefore should not be construed as being limiting in any way. The screen display 200 also can include an option 230 that allows one or more call handling action identifiers to be applied to a selected call authentication parameter. For example, the customer may have indicated that the call handling scenario should include the call authentication parameter 222A for the whitelist, and the customer may select the call handling action identifier 226A associated with the action for allowing the call to be associated with the call authentication parameter 222A. The customer can select the option 230 to add an additional and/or alternate action to be associated with the call authentication parameter 222A by selecting the call handling action identifier 226I to also apply. Thus, the calls that are applied via the call authentication parameter 222A will be subject to both the call handling action identifier 226A which allows the calls and the call handling action identifier 226I, which mutes the call when the calls are received within a defined time window (e.g., during business hours of 9 A.M. to 5 P.M.). It should be understood that this example is illustrative and therefore should not be construed as being limiting in any way.

The screen display 200 also can include a UI control 232 that, when selected, creates a call authentication scenario, such as the call authentication scenario 116 with the title, data source identifier indication, communication interface indication, call authentication parameter indication, call handling action indication and/or rules and definitions specified within the indicators of the screen display 200. It should be understood that the screen display 200 can be displayed at various times other than during creation of the call authentication scenario 116. For example, the screen display 200 can be presented in response to selection of an "options" control (not shown), or the like. It should be understood that this example is illustrative and therefore should not be construed as being limiting in any way. The screen display 200 for the call handling service 110 also can include a UI control 234 to cancel creation of the call authentication scenario 116 and/or to exit the screen display 200. The fields, controls, and/or other information shown in the embodiment of screen display 200 are illustrative and the screen display 200 provided by the call management application 108 can include various menus and/or menu options, fields, or other information not shown in FIG. 2. Because additional or alternative controls can be included in the screen display 200, it should be understood that the example embodiment shown in FIG. 2 is illustrative and therefore should not be construed as being limiting in any way.

Figure 3:
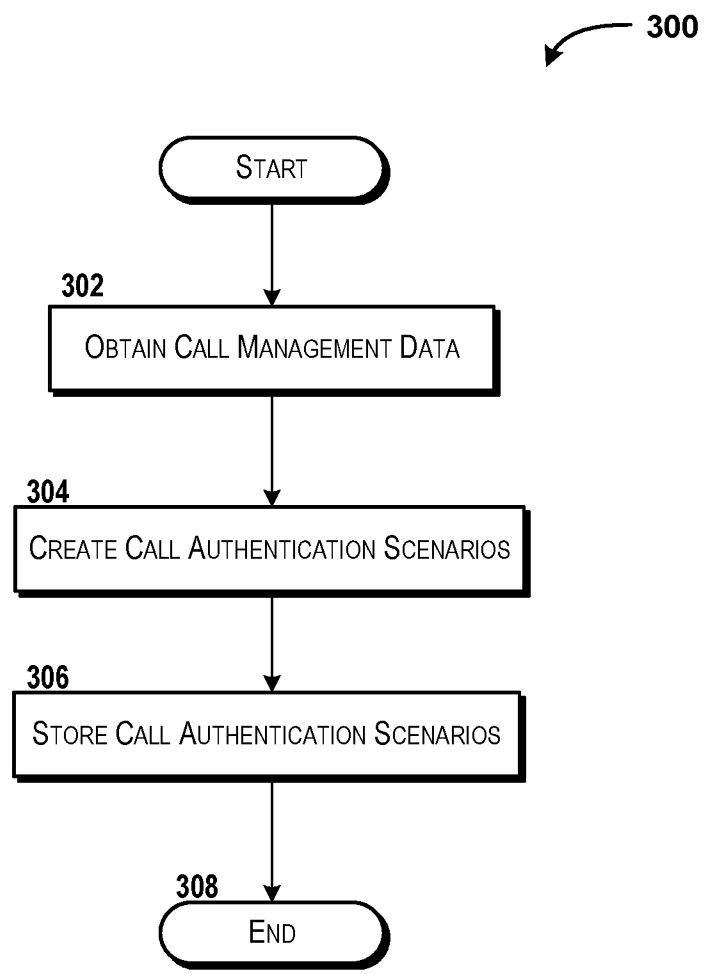
FIG. 3 is a flow diagram showing aspects of a method for generating a call authentication scenario, according to an illustrative embodiment of the concepts and technologies described herein.

Turning now to FIG. 3, aspects of a method 300 for generating a call authentication scenario, such as the call authentication scenario 116, will be described in detail, according to an illustrative embodiment. It should be understood that the operations of the methods disclosed herein (e.g., the method 300 and a method 400) are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the handler device 112, to perform one or more operations and/or causing the processor to direct other components of the computing system or device to perform one or more of the operations.

For purposes of illustrating and describing the concepts of the present disclosure, the methods disclosed herein are described as being performed by the handler device 112 via execution of one or more software modules such as, for example, the call handling service 110 that configure one or more processors. It should be understood that additional and/or alternative devices and/or network nodes can provide the functionality described herein via execution of one or more modules, applications, and/or other software including, but not limited to, the call handling service 110. Thus, the illustrated embodiments are illustrative, and should not be viewed as being limiting in any way.

The method 300 begins at operation 302. At operation 302, the handler device 112 executing the call handling service 110 can obtain call management data 114 from a device, such as the user device 102. According to various embodiments, the handler device 112 can be interacted with by the device (e.g., the user device 102) to create or submit the call management data 114. Thus, it can be appreciated that the data obtained in operation 302 can be obtained by the handler device 112 via interactions between the network 104, the user device 102, and the handler device 112 via a web portal and/or other portal exposed by the handler device 112, in order to receive the call management data 114 generated by the call management application 108 that executes on the user device 102. In some embodiments, the call management application 108 can provide the call management data 114 upon request from the call handling service 110 and/or based on a trigger, such as when a user of the user device 102 accesses the call management application 108 and creates and/or updates the call management data 114. Because the call management data 114 can be obtained in any number of manners, it should be understood that these examples are illustrative and therefore should not be construed as being limiting in any way.

The call management data 114 obtained by the call handling service 110 can include a call authentication parameter (e.g., one of the call authentication parameters 222A-222K); a data source identifier (e.g., one or more of the data source identifiers 210A, 210B) that identifies a data source that comprises the storage location of data to be accessed (e.g., the collective data source 140 that comprises the storage location of collective data 142 that can be accessed); customer account data (e.g., the customer account data 202) that identifies a customer account associated with the called party device 120 that is the intended recipient of the call 119; communication interface data (e.g., including one of the interface identifiers 218A-218F) that identifies the communication interface (e.g., one or more of the communication interfaces 109, 111, 113, 115, and/or 117) with which the call authentication parameter (e.g., one or more of the call authentication parameters 222A-222K) applies; a call handling action identifier (e.g., one or more of the call handling action identifiers 226A-226M) that defines one or more actions to be performed in response to the call handling command 146 being provided to the network 104 (and/or another device, such as the called party device 120, the network entity 148, the usage server 152, and/or the PCSCF 133) when the call authentication parameter applies; a combination thereof, or the like. It is understood that one or more instances of the call management data 114 can be obtained by the call handling service 110 executing on the handler device 112. It should be understood that these examples are illustrative and therefore should not be construed as being limiting in any way.

From operation 302, the method 300 proceeds to operation 304. At operation 304, the handler device 112 can create, based upon the call management data 114 obtained in operation 302, one or more call authentication scenarios 116. The call authentication scenarios 116 can be compiled and/or assembled into a package and/or program module that can be called upon by the call handling service 110 when a call pertaining to the called party device 120 is detected by the call handling service 110. The call authentication scenarios 116 can include the call management data 114 that provides instructions for determining when one or more call authentication parameters will or will not apply according to the communication interface used for the call 119, and rules for determining when one or more data source identifiers that can identify one or more resources (e.g., the collective data source 140, the siloed data source 128, web pages, web applications, files, or the like) are to be accessed when handling and/or routing a call, and/or other information. According to various embodiments, the handler device 112 also can capture information that identifies the customer or other entity associated with the call authentication scenarios 116, such as by identifying and retaining the customer account data 202. This information can be used by the call handling service 110 to index and/or query the call authentication scenarios 116 when an inbound call (inbound for the called party device 120 from the calling party device 126) is being transmitted and/or routed to the called party device 120. It can be appreciated that when routing of the call 119 is being performed, the identity of the calling party and/or calling party device 126 can be used to query or search the call authentication scenarios 116 to identify relevant call authentication scenarios 116. In some embodiments, the call authentication scenarios 116 can be updated with the siloed data 136 and/or the collective data 142. It should be understood that this example is illustrative and therefore should not be construed as being limiting in any way.

From operation 304, the method 300 proceeds to operation 306. At operation 306, the handler device 112 can store the call authentication scenarios 116. As noted above, the call authentication scenarios 116 can be stored with data that indexes the call authentication scenarios 116 to particular users and/or devices, such as by use of the customer account data 202) though this may not necessarily be the case. The call authentication scenarios 116 can be stored at a data storage location such as, for example, a memory of the handler device 112. It should be understood that this example is illustrative and therefore should not be construed as being limiting in any way.

From operation 306, the method 300 proceeds to operation 308. The method 300 ends at operation 308.

Figure 4:
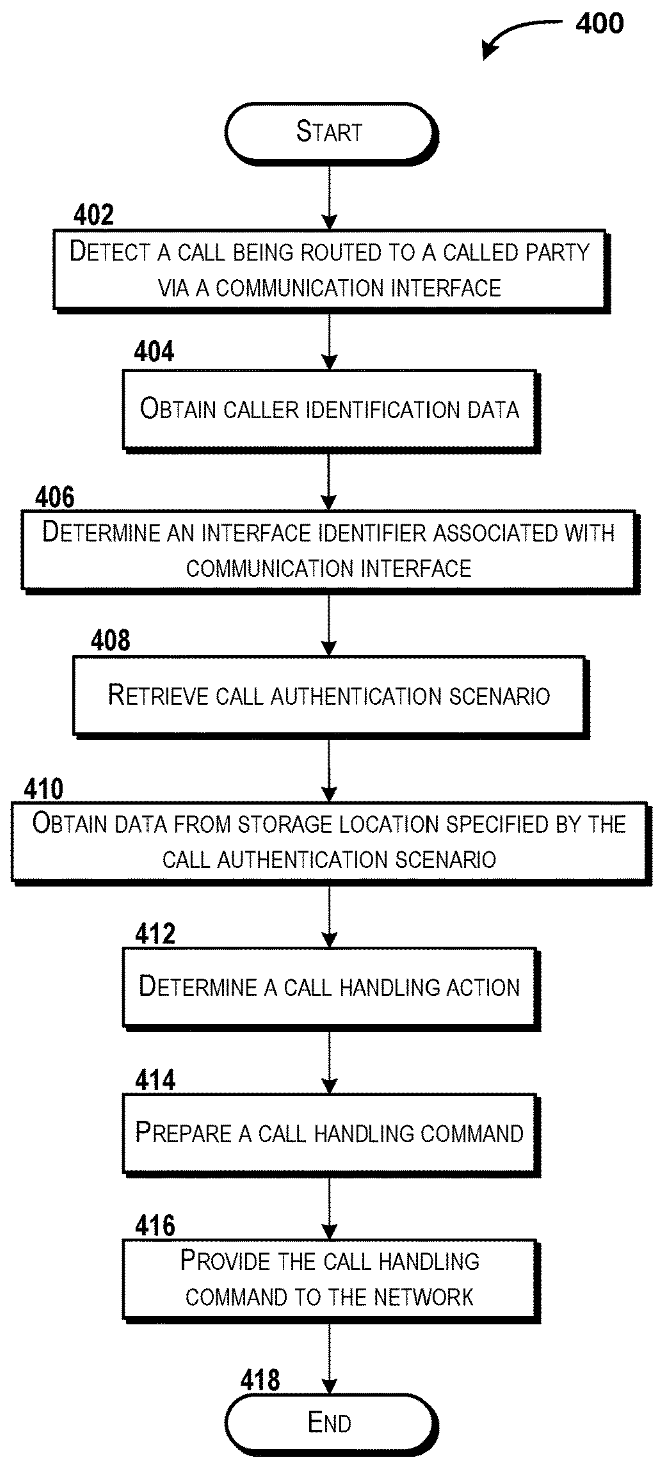
FIG. 4 is a flow diagram showing aspects of a method for providing call authentication, screening, and routing using a call handing service, according to an illustrative embodiment of the concepts and technologies described herein.

Turning now to FIG. 4, aspects of the method 400 for providing call authentication, screening, and routing using a call handling service, such as the call handling service 110, will be described in detail, according to an illustrative embodiment. The method 400 begins at operation 402, where the handler device 112 executing the call handling service 110 can detect that a call, such as the call 119, from a calling party is being routed to a called party device, such as the called party device 120, associated with a customer.

The call 119 can be intended for the called party device 120 associated with the customer. The call 119 can be routed via a communication interface, such as one of the communication interfaces 109, 111, 113, 115, or 117. In some embodiments, the call 119 can be detected by the call handling service 110 before the call 119 is received by the called party device 120. In some embodiments, the call handling service 110 is executed by a processor that is included within a pass-through dongle that is an intermediary between the called party device 120 and the network 104 with which the call 119 is routed.

From operation 402, the method 400 proceeds to operation 404 where the call handling service 110 can obtain caller ID data 118 that is associated with the call 119. The caller ID data 118 can specify an identity that is generated and/or provided by the calling party, such as via the calling party device 126. The identity specified by the caller ID data 118 is intended to be representative of the calling party when presented to the customer by the called party device 120. However, according to embodiments, the identity specified by the caller ID data 118 may actually misrepresent the calling party and instead represent, or approximately represent, another person, business, corporation, or other unassociated target, such as the unassociated target 158, that is not affiliated with, associated with, and/or corresponding to the calling party device 126.

From operation 404, the method 400 proceeds to operation 406 where the call handling service 110 can determine an interface identifier associated with the communication interface, such as one of the interface identifiers 218A-218F associated with one of the communication interfaces 109, 111, 113, 115, or 117 of the handler device 112, through which the call 119 is routed. In some embodiments, the communication interface is one of a plurality of communication interfaces that are identifiable by the call handling service 110 via the interface identifiers 218A-218F. In some embodiments, each of the plurality of communication interfaces 109, 111, 113, 115, and/or 117 is associated with a respective one or more of a voice over internet protocol, a plain old telephone service, a wireless local area network, a wireless wide area network, and a software defined network controller.

From operation 406, the method 400 proceeds to operation 408 where the call handling service 110 can retrieve a call authentication scenario, such as the call authentication scenario 116, based on the interface identifier that is determined (e.g., an interface identifier corresponding to a communication interface, which may also be included in the call authentication scenario 116). For example, the call authentication scenario 116 may apply to one of the interface identifiers 218A-218F because the communication interface associated with one of the interface identifiers 218A-218F was used to route and/or transmit the call 119. The call authentication scenario 116 can specify a storage location of data that is to be accessed. For example, the call authentication scenario 116 can specify the collective data source 140 and/or the siloed data source 128. The call authentication scenario 116 also can specify a call authentication parameter (e.g., one of the call authentication parameters 222A-222K) by which to determine a call handling action (e.g., correspond with one of the call handling action identifiers 226A-226M) for the call 119.

From operation 408, the method 400 proceeds to operation 410 where the call handling service 110 can obtain the data from the storage location specified by the call authentication scenario 116. For example, the call handling service 110 can obtain the siloed data 136 from the siloed data source 128 and/or the collective data 142 from the collective data source 140. The siloed data source 128 can be associated with the customer corresponding to the called party device 120. In some embodiments, the collective data source 140 is remote from the call handling service 110 and can be accessed via the network 104.

From operation 410, the method 400 proceeds to operation 412 where the call handling service 110 can determine the call handling action that is to be taken (e.g., call handling actions corresponding to one or more of the call handling action identifiers 226A-226M) by analyzing the caller ID data 118, the data obtained from the storage location (e.g., the siloed data 136 and/or the collective data 142), the call authentication parameters 222A-222K for the call authentication scenario 116, a combination thereof, or the like. In some embodiments, the call handling action includes one or more of allowing the call 119 to proceed to the called party device 120 (e.g., via association with the call handling action identifier 226A), preventing the call 119 from proceeding to the called party device 120 (e.g., via association with the call handling action identifier 226B), sending the call 119 to voicemail (e.g., via association with the call handling action identifier 226J), ignoring the call 119 (e.g., via association with the call handling action identifier 226F), diverting the call 119 (e.g., via association with the call handling action identifier 226J and/or 226K), any combination thereof, or the like.

From operation 412, the method 400 proceeds to operation 414 where the call handling service 110 can prepare a call handling command, such as the call handling command 146, based on the call handling action identified (e.g., via one or more of the call handling action identifiers 226A-226M) in the call authentication scenario 116, the caller ID data 118, the data obtained from the storage location (e.g., the siloed data 136 and/or the collective data 142), other information in the call authentication scenario 116, a combination thereof, or the like. It should be understood that this example is illustrative and therefore should not be construed as being limiting in any way.

From operation 414, the method 400 proceeds to operation 416 where the call handling service 110 can provide the call handling command 146 to a network, such as the network 104, from which the call 119 is being routed and/or was transmitted. The call handling command 146 can direct the network 104 (and/or other devices) to perform the call handling action (e.g., via one or more of the call handling action identifiers 226A-226M) in response to the call handling command 146 being provided to the network 104. In some embodiments, the call handling command 146 can direct the performance of two or more actions by another device, system, and/or entity, such as the network 104, the called party device 120, the network entity 148, and/or the usage server 152. In some embodiments, the call handling command 146 can include actions such as diverting the call 119 and storing a call data record, such as the call data record 150. For example, the call 119 can be diverted to the unassociated target 158, such as by forwarding the call 119 to the PCSCF 133 of the network 104, which in turn is instructed by the call handling command 146 to create a diverted call, such as the diverted call 156, that directs the calling party to the unassociated target 158 instead of allowing the call 119 to proceed to the called party device 120. The decision to divert the call 119 to the unassociated target 158 can be based on a determination that the identity specified in the caller ID data 118 of the call 119 is representative of, or approximately representative of, the unassociated target 158 even though the caller ID data 118 was generated by the calling party device 126 and both the calling party and the calling party device 126 are not associated with the unassociated target 158. Thus, in this embodiment, the caller ID data 118 misrepresents, misleads, obfuscates, or otherwise spoofs the actual identity of the calling party device 126. However, because the call handling service 110 detects the misrepresentation, the call 119 can be diverted to the unassociated target 158, whose identity is being spoofed by the calling party via the caller ID data 118. By diverting the call 119 to the unassociated target 158, the unassociated target 158 can be made aware of this specific instance of spoofing via the caller ID data 118 associated with the call 119. Diverting the call 119 can also allow for back-end tracking to determine the frequency with which the identity of the unassociated target 158 is being spoofed. Additionally, in embodiments, the unassociated target 158 can be given the opportunity to confront the calling party or another party placing the call via the calling party device 126 regarding the spoofing of the identity of the unassociated target 158.

The call handling command 146 also can include an instruction to store a call data record, such as the call data record 150, that documents the call 119 being diverted to the unassociated target 158. In embodiments, the call data record 150 can be provided by the PCSCF 133 of the network 104. The call data record 150 can provide a data log or recordation of call events, such as time, date, the caller ID data 118 of the call 119, and/or other information pertaining to the call 119. The call data record 150 can also include information about the diverted call 156, which was initiated based on the call handling command 146 from the call handling service 110. In embodiments, the call handling command 146 can be provided to the usage server 152. The call handling command 146 can instruct the usage server 152 to store the call data record 150 for inclusion in the call report 154 associated with the customer of the called party device 120. Specifically, in embodiments, the call handling command 146 can direct the usage server 152 to concatenate the caller ID data 118 with the call data record 150 that documents the call 119 being diverted to the unassociated target 158 via the initiation of the diverted call 156. In embodiments, the call report 154 can include a total amount of call handling commands performed within a specific time period, such as a billing cycle. This can allow the customer of the called party device 120 to see how often the call handling service 110 is acting to mitigate and handle unwanted calls.

From operation 416, the method 400 proceeds to operation 418. The method 400 ends at operation 418.

Figure 5:
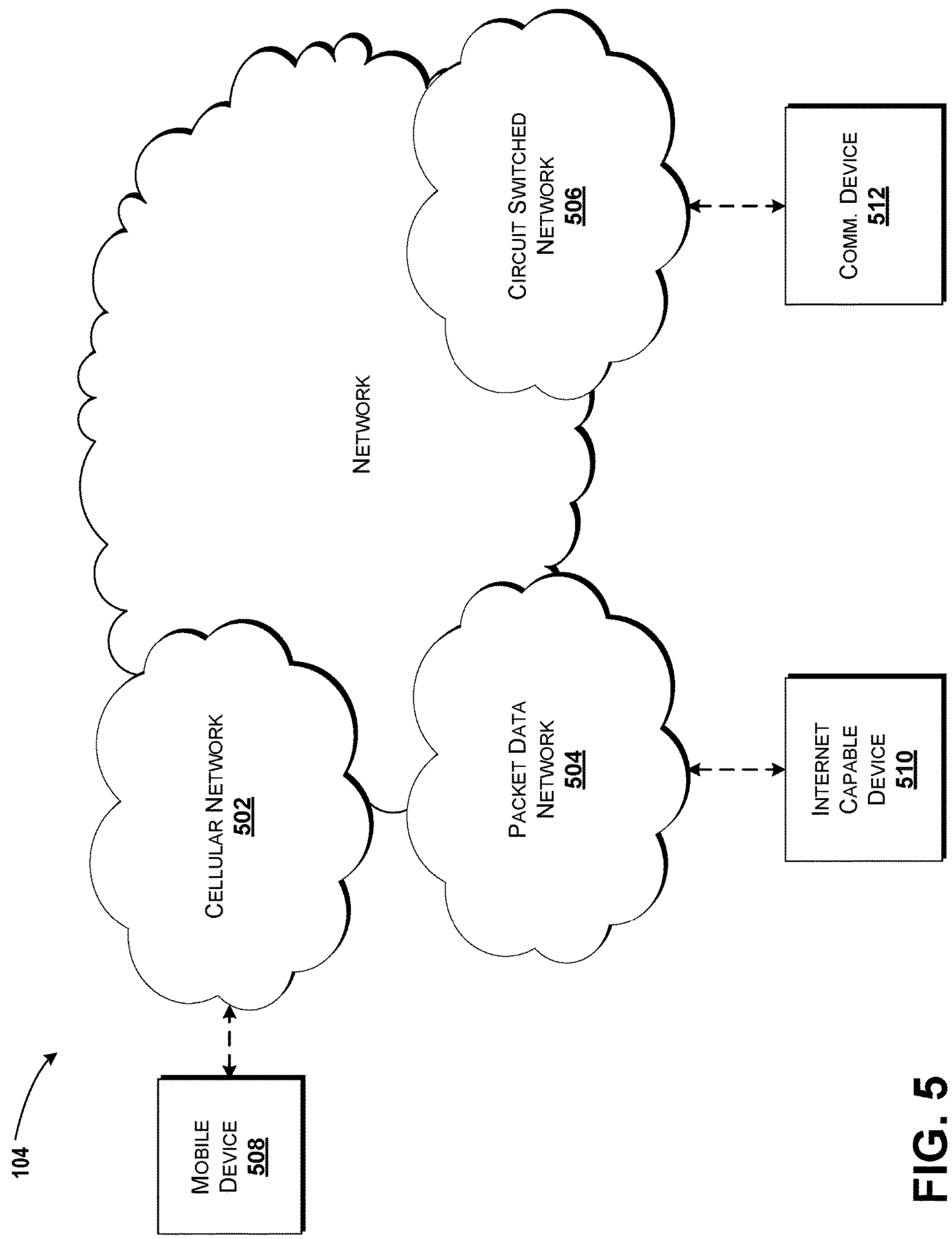
FIG. 5 schematically illustrates a network, according to an illustrative embodiment of the concepts and technologies described herein.

Turning now to FIG. 5, additional details of the network 104 are illustrated, according to an illustrative embodiment. The network 104 includes a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSUPA), and HSPA+. The cellular network 502 also is compatible with 4G mobile communications standards as well as evolved and future mobile standards.

The packet data network 504 includes various devices, for example, servers, computers, databases, and other devices in communication with one another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 104 is used to refer broadly to any combination of the networks 502, 504, 506. It should be appreciated that substantially all of the functionality described with reference to the network 104 can be performed by the cellular network 502, the packet data network 504, and/or the circuit switched network 506, alone or in combination with other networks, network elements, and the like. Although not illustrated separately in FIG. 5, it should be understood that the IMS 130 can be a part of the cellular network 502, though this is not necessarily the case.

Figure 6:
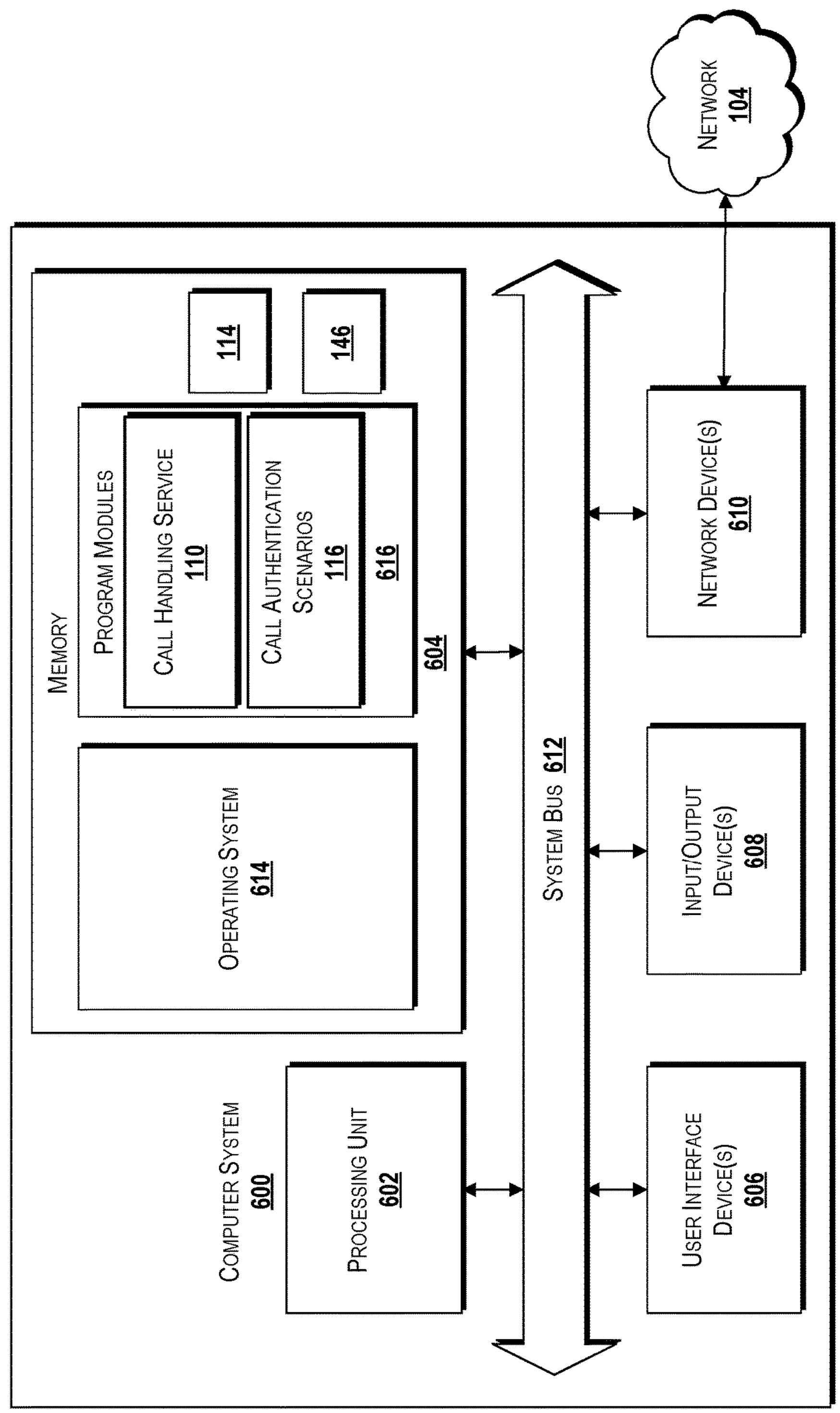
FIG. 6 is a block diagram illustrating an example computer system configured to provide, implement, and use a call handling service, according to some illustrative embodiments of the concepts and technologies described herein.

FIG. 6 is a block diagram illustrating a computer system 600 configured to provide the functionality described herein for providing and using a call handling service, in accordance with various embodiments of the concepts and technologies disclosed herein. In aspects, the handler device 112 illustrated and described herein can be configured as and/or can have an architecture similar or identical to the computer system 600. In some embodiments, the usage server 152 can be configured as and/or have an architecture that is similar or identical to the computer system 600. The computer system 600 includes a processing unit 602, a memory 604, one or more user interface devices 606, one or more input/output ("I/O") devices 608, and one or more network devices 610, each of which is operatively connected to a system bus 612. The system bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software and/or program modules described herein. In some embodiments, for example, the program modules 616 include the call management application 108, the call handling service 110, and/or other program modules. These and/or other programs can be embodied in computer-readable media containing instructions that, when executed by the processing unit 602, perform one or more of the methods 300, 400 described in detail above with respect to FIGS. 3-4. According to some embodiments, the program modules 616 may be embodied in hardware, software, firmware, or any combination thereof. Although not shown in FIG. 6, it should be understood that the memory 604 also can be configured to store the call management data 114, the call authentication scenarios 116, the call handling command 146, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 104. Examples of the network devices 610 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 7:
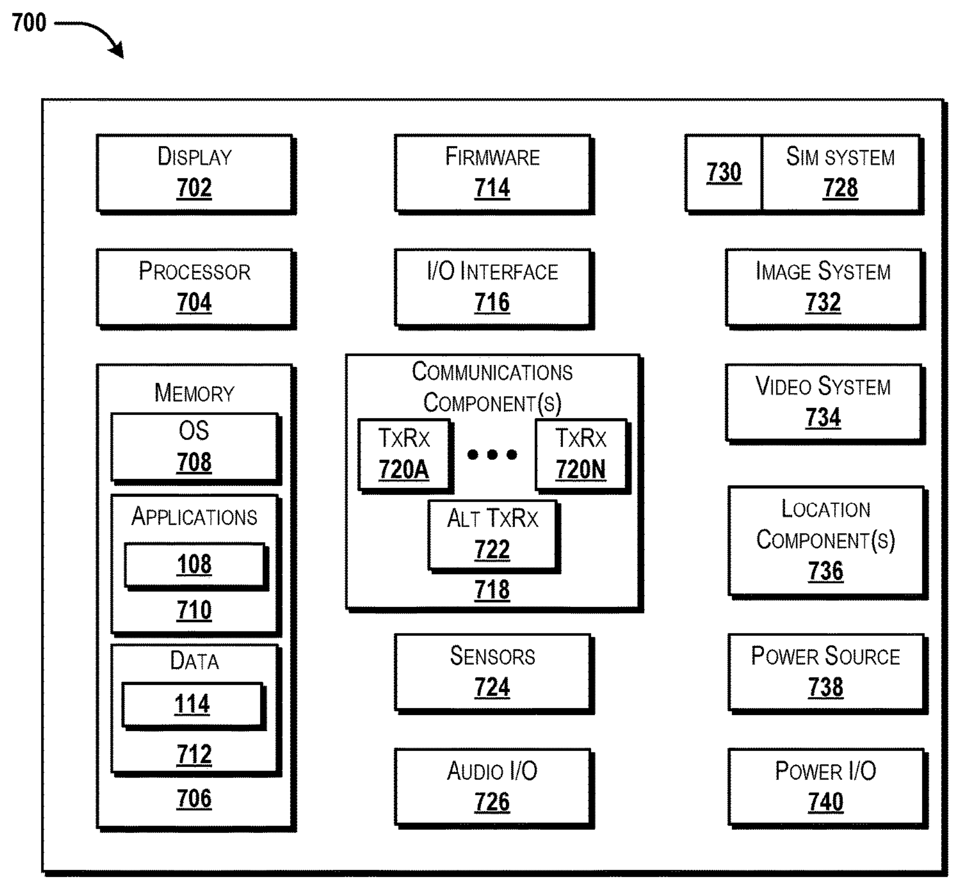
FIG. 7 is a block diagram illustrating an example mobile device configured to interact with a call handling service, according to some illustrative embodiments of the concepts and technologies described herein.

Turning now to FIG. 7, an illustrative mobile device 700 and components thereof will be described. In some embodiments, the user device 102, the called party device 120, the calling party device 126, and/or other devices illustrated and described herein can be configured as and/or can have an architecture similar or identical to the mobile device 700 described herein in FIG. 7. It should be understood, however, that the various devices illustrated and described herein may or may not include the functionality described herein with reference to FIG. 7. While connections are not shown between the various components illustrated in FIG. 7, it should be understood that some, none, or all of the components illustrated in FIG. 7 can be configured to interact with one other to carry out various device functions. In some embodiments, the components are arranged so as to communicate via one or more busses (not shown). Thus, it should be understood that FIG. 7 and the following description are intended to provide a general understanding of a suitable environment in which various aspects of embodiments can be implemented, and should not be construed as being limiting in any way.

As illustrated in FIG. 7, the mobile device 700 can include a display 702 for displaying data. According to various embodiments, the display 702 can be configured to display various graphical user interface ("GUI") elements for obtaining and/or modifying call authentication scenarios 116, creating or managing groups of call authentication scenarios 116, text, images, video, virtual keypads and/or keyboards, messaging data, notification messages, metadata, internet content, device status, time, date, calendar data, device preferences, map and location data, combinations thereof, and/or the like. The mobile device 700 also can include a processor 704 and a memory or other data storage device ("memory") 706. The processor 704 can be configured to process data and/or can execute computer-executable instructions stored in the memory 706. The computer-executable instructions executed by the processor 704 can include, for example, an operating system 708, one or more applications 710 such as the call management application 108, some of the call handling service 110, call management data 114, and/or other computer-executable instructions stored in a memory 706, or the like. In some embodiments, the applications 710 also can include a UI application (not illustrated in FIG. 7).

The UI application can interface with the operating system 708, such as the operating system 106 shown in FIG. 1, to facilitate user interaction with functionality and/or data stored at the mobile device 700 and/or stored elsewhere. In some embodiments, the operating system 708 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 704 to aid a user in entering content, creating call authentication scenarios 116, configuring settings, manipulating address book content and/or settings, multimode interaction, interacting with other applications 710, and otherwise facilitating user interaction with the operating system 708, the applications 710, and/or other types or instances of data 712 that can be stored at the mobile device 700. According to various embodiments, the data 712 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 710, the data 712, and/or portions thereof can be stored in the memory 706 and/or in a firmware 714, and can be executed by the processor 704. The firmware 714 also can store code for execution during device power up and power down operations. It can be appreciated that the firmware 714 can be stored in a volatile or non-volatile data storage device including, but not limited to, the memory 706 and/or a portion thereof.

The mobile device 700 also can include an input/output ("I/O") interface 716. The I/O interface 716 can be configured to support the input/output of data such as call management data 114, a query 134, a message 138, a call handling command 146, a call data record 150, siloed data 136, collective data 142, caller ID data 118, user information, organization information, presence status information, user IDs, passwords, and application initiation (start-up) requests. In some embodiments, the I/O interface 716 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 700 can be configured to synchronize with another device to transfer content to and/or from the mobile device 700. In some embodiments, the mobile device 700 can be configured to receive updates to one or more of the applications 710 via the I/O interface 716, though this is not necessarily the case. In some embodiments, the I/O interface 716 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 716 may be used for communications between the mobile device 700 and a network device or local device.

The mobile device 700 also can include a communications component 718. The communications component 718 can be configured to interface with the processor 704 to facilitate wired and/or wireless communications with one or more networks such as the network 104 described herein. In some embodiments, other networks include networks that utilize non-cellular wireless technologies such as WI-FI or WIMAX. In some embodiments, the communications component 718 includes a multimode communications subsystem for facilitating communications via the cellular network and one or more other networks.

The communications component 718, in some embodiments, includes one or more transceivers. The one or more transceivers, if included, can be configured to communicate over the same and/or different wireless technology standards with respect to one another. For example, in some embodiments one or more of the transceivers of the communications component 718 may be configured to communicate using GSM, CDMAONE, CDMA2000, LTE, and various other 2G, 2.5G, 3G, 4G, and greater generation technology standards. Moreover, the communications component 718 may facilitate communications over various channel access methods (which may or may not be used by the aforementioned standards) including, but not limited to, TDMA, FDMA, W-CDMA, OFDM, SDMA, and the like.

In addition, the communications component 718 may facilitate data communications using GPRS, EDGE, the HSPA protocol family including HSDPA, EUL or otherwise termed HSUPA, HSPA+, and various other current and future wireless data access standards. In the illustrated embodiment, the communications component 718 can include a first transceiver ("TxRx") 720A that can operate in a first communications mode (e.g., GSM). The communications component 718 also can include an N$^{th}$ transceiver ("TxRx") 720N that can operate in a second communications mode relative to the first transceiver 720A (e.g., UMTS). While two transceivers 720A-N (hereinafter collectively and/or generically referred to as "transceivers 720") are shown in FIG. 7, it should be appreciated that less than two, two, and/or more than two transceivers 720 can be included in the communications component 718.

The communications component 718 also can include an alternative transceiver ("Alt TxRx") 722 for supporting other types and/or standards of communications. According to various contemplated embodiments, the alternative transceiver 722 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 718 also can facilitate reception from terrestrial radio networks, digital satellite radio networks, internet-based radio service networks, combinations thereof, and the like. The communications component 718 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 700 also can include one or more sensors 724. The sensors 724 can include temperature sensors, light sensors, air quality sensors, movement sensors, orientation sensors, noise sensors, proximity sensors, or the like. As such, it should be understood that the sensors 724 can include, but are not limited to, accelerometers, magnetometers, gyroscopes, infrared sensors, noise sensors, microphones, combinations thereof, or the like. Additionally, audio capabilities for the mobile device 700 may be provided by an audio I/O component 726. The audio I/O component 726 of the mobile device 700 can include one or more speakers for the output of audio signals, one or more microphones for the collection and/or input of audio signals, and/or other audio input and/or output devices.

The illustrated mobile device 700 also can include a subscriber identity module ("SIM") system 728. The SIM system 728 can include a universal SIM ("USIM"), a universal integrated circuit card ("UICC") and/or other identity devices. The SIM system 728 can include and/or can be connected to or inserted into an interface such as a slot interface 730. In some embodiments, the slot interface 730 can be configured to accept insertion of other identity cards or modules for accessing various types of networks. Additionally, or alternatively, the slot interface 730 can be configured to accept multiple subscriber identity cards. Because other devices and/or modules for identifying users and/or the mobile device 700 are contemplated, it should be understood that these embodiments are illustrative, and should not be construed as being limiting in any way.

The mobile device 700 also can include an image capture and processing system 732 ("image system"). The image system 732 can be configured to capture or otherwise obtain photos, videos, and/or other visual information. As such, the image system 732 can include cameras, lenses, charge-coupled devices ("CCDs"), combinations thereof, or the like. The mobile device 700 may also include a video system 734. The video system 734 can be configured to capture, process, record, modify, and/or store video content. Photos and videos obtained using the image system 732 and the video system 734, respectively, may be added as message content to an MMS message, email message, and sent to another mobile device. The video and/or photo content also can be shared with other devices via various types of data transfers via wired and/or wireless communication devices as described herein.

The mobile device 700 also can include one or more location components 736. The location components 736 can be configured to send and/or receive signals to determine a geographic location of the mobile device 700. According to various embodiments, the location components 736 can send and/or receive signals from global positioning system ("GPS") devices, assisted-GPS ("A-GPS") devices, WI-FI/WIMAX and/or cellular network triangulation data, combinations thereof, and the like. The location component 736 also can be configured to communicate with the communications component 718 to retrieve triangulation data for determining a location of the mobile device 700. In some embodiments, the location component 736 can interface with cellular network nodes, telephone lines, satellites, location transmitters and/or beacons, wireless network transmitters and receivers, combinations thereof, and the like. In some embodiments, the location component 736 can include and/or can communicate with one or more of the sensors 724 such as a compass, an accelerometer, and/or a gyroscope to determine the orientation of the mobile device 700. Using the location component 736, the mobile device 700 can generate and/or receive data to identify its geographic location, or to transmit data used by other devices to determine the location of the mobile device 700. The location component 736 may include multiple components for determining the location and/or orientation of the mobile device 700.

The illustrated mobile device 700 also can include a power source 738. The power source 738 can include one or more batteries, power supplies, power cells, and/or other power subsystems including alternating current ("AC") and/or direct current ("DC") power devices. The power source 738 also can interface with an external power system or charging equipment via a power I/O component 740. Because the mobile device 700 can include additional and/or alternative components, the above embodiment should be understood as being illustrative of one possible operating environment for various embodiments of the concepts and technologies described herein. The described embodiment of the mobile device 700 is illustrative, and should not be construed as being limiting in any way.

Based on the foregoing, it should be appreciated that systems and methods for providing and using a routing service have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:

detecting, by a processor of a system, that a call from a calling party device is being routed, via a communication interface, to a called party device;

obtaining, by the processor, caller identification data associated with the call;

determining, by the processor, an interface identifier associated with the communication interface;

retrieving, by the processor, a call authentication scenario based on the interface identifier associated with the communication interface, wherein the call authentication scenario specifies a call authentication parameter by which to determine a call handling action for the call;

determining, by the processor, the call handling action at least by analyzing the caller identification data and the call authentication parameter of the call authentication scenario;

preparing, by the processor, a call handling command based at least on the call handling action; and providing, by the processor, the call handling command to a network from which the call is being routed, wherein the call handling command directs performance of the call handling action for the call.

2. The method of claim 1, wherein the call handling action includes at least one of allowing the call to proceed to the called party device, preventing the call from proceeding to the called party device, sending the call to voicemail, ignoring the call, or diverting the call.

3. The method of claim 1, wherein the communication interface is associated with at least one of a voice over internet protocol, a plain old telephone service, a wireless local area network, a wireless wide area network, or a software defined network controller.

4. The method of claim 1, further comprising:

generating, by the processor, the call authentication scenario, wherein generating the call authentication scenario comprises:

obtaining, from a user device, call management data that includes:

the call authentication parameter, a data source identifier that identifies a data source that comprises a storage location of data to be accessed, customer account data that identifies a customer account associated with the called party device that is an intended recipient of the call, communication interface data that identifies the communication interface with which the call authentication parameter applies, and a call handling action identifier that defines one or more actions to be performed in response to the call handling command being provided to the network when the call authentication parameter applies; and creating, by the processor, the call authentication scenario based on the call management data; and storing, by the processor, the call authentication scenario.

5. The method of claim 1, wherein the call handling action comprises:

diverting the call to an unassociated target based on determining that an identity specified in the caller identification data is representative of the unassociated target despite the caller identification data being generated by the calling party device, wherein the calling party device is not associated with the unassociated target, storing a call data record that documents the call being diverted to the unassociated target, and providing, by the processor, the call handling command to a usage server, wherein the call handling command directs the usage server to concatenate the caller identification data with the call data record that documents the call being diverted to the unassociated target.

6. The method of claim 1, wherein the call authentication scenario specifies a storage location of data that is to be accessed, where the storage location includes at least one of a siloed data source and a collective data source, and wherein the call handling action is determined at least in part based on data corresponding to at least one of the siloed data source and the collective data source.

7. The method of claim 1, wherein the call is detected by the processor before the call is received by the called party device.

8. The method of claim 1, wherein the system comprises a pass-through dongle that is an intermediary between the called party device and the network with which the call is routed, wherein the pass-through dongle comprises the communication interface that receives the call.

9. A system comprising:

a processor; and a memory that stores computer-executable instructions that, in response to being executed by the processor, cause the processor to perform operations comprising:

detecting that a call from a calling party device is being routed, via a communication interface, to a called party device, obtaining caller identification data associated with the call, determining an interface identifier associated with the communication interface, retrieving a call authentication scenario based on the interface identifier associated with the communication interface, wherein the call authentication scenario specifies a call authentication parameter by which to determine a call handling action for the call, determining the call handling action at least by analyzing the caller identification data and the call authentication scenario, preparing a call handling command based at least in part on the call handling action, and providing the call handling command to a network from which the call is being routed, wherein the call handling command directs performance of the call handling action for the call.

10. The system of claim 9, wherein the call handling action includes at least one of allowing the call to proceed to the called party device, preventing the call from proceeding to the called party device, sending the call to voicemail, ignoring the call, or diverting the call.

11. The system of claim 9, wherein the communication interface is associated with at least one of a voice over internet protocol, a plain old telephone service, a wireless local area network, a wireless wide area network, or a software defined network controller.

12. The system of claim 9, wherein the call authentication scenario specifies a storage location of data that is to be accessed, where the storage location includes at least one of a siloed data source and a collective data source, and wherein the call handling action is determined at least in part based on data corresponding to at least one of the siloed data source and the collective data source.

13. The system of claim 9, wherein the operations further comprise:

generating the call authentication scenario, wherein generating the call authentication scenario comprises:

obtaining, from a user device, call management data that includes:

the call authentication parameter, a data source identifier that identifies a data source that comprises a storage location of data to be accessed, customer account data that identifies a customer account associated with the called party device that is an intended recipient of the call, communication interface data that identifies the communication interface with which the call authentication parameter applies, and a call handling action identifier that defines one or more actions to be performed in response to the call handling command being provided to the network when the call authentication parameter applies; and creating the call authentication scenario based on the call management data; and storing the call authentication scenario.

14. The system of claim 13, wherein the call handling action comprises:

diverting the call to an unassociated target based on determining that an identity specified in the caller identification data is representative of the unassociated target despite the caller identification data being generated by the calling party device, wherein the calling party device is not associated with the unassociated target, storing a call data record that documents the call being diverted to the unassociated target, and providing the call handling command to a usage server, wherein the call handling command directs the usage server to concatenate the caller identification data with the call data record that documents the call being diverted to the unassociated target.

15. The system of claim 9, wherein the system further comprises a pass-through dongle that is an intermediary between the called party device and the network with which the call is routed, wherein the pass-through dongle comprises the communication interface that receives the call.

16. A computer storage medium having computer-executable instructions stored thereon that, in response to execution by a processor, cause the processor to perform operations comprising:

detecting that a call from a calling party device is being routed, via a communication interface, to a called party device;

obtaining caller identification data associated with the call;

determining an interface identifier associated with the communication interface;

retrieving a call authentication scenario based on the interface identifier associated with the communication interface, wherein the call authentication scenario specifies a call authentication parameter by which to determine a call handling action for the call;

determining the call handling action for the call at least by analyzing the caller identification data and the call authentication parameter of the call authentication scenario;

preparing a call handling command based at least in part on the call handling action; and providing the call handling command to a network from which the call is being routed, wherein the call handling command directs performance of the call handling action for the call.

17. The computer storage medium of claim 16, wherein the call handling action includes at least one of allowing the call to proceed to the called party device, preventing the call from proceeding to the called party device, sending the call to voicemail, ignoring the call, or diverting the call.

18. The computer storage medium of claim 16, wherein the operations further comprise:

generating the call authentication scenario, wherein generating the call authentication scenario comprises:

obtaining, from a user device, call management data that includes:

the call authentication parameter, a data source identifier that identifies a data source that comprises a storage location of data to be accessed, customer account data that identifies a customer account associated with the called party device that is an intended recipient of the call, communication interface data that identifies the communication interface with which the call authentication parameter applies, and a call handling action identifier that defines one or more actions to be performed in response to the call handling command being provided to the network when the call authentication parameter applies; and creating the call authentication scenario based on the call management data; and storing the call authentication scenario.

19. The computer storage medium of claim 18, wherein the call handling action comprises:

diverting the call to an unassociated target based on determining that an identity specified in the caller identification data is representative of the unassociated target despite the caller identification data being generated by the calling party device, wherein the calling party device is not associated with the unassociated target, and storing a call data record that documents the call being diverted to the unassociated target.

20. The computer storage medium of claim 16, wherein the communication interface is associated with at least one of a voice over internet protocol, a plain old telephone service, a wireless local area network, a wireless wide area network, or a software defined network controller.

* * * * *